(12) United States Patent
Nakamura et al.

(10) Patent No.: US 8,374,437 B2
(45) Date of Patent: Feb. 12, 2013

(54) INFORMATION PROCESSING APPARATUS, INFORMATION PROCESSING METHOD, IMAGE IDENTIFYING APPARATUS, IMAGE IDENTIFYING METHOD, AND PROGRAM

(75) Inventors: Akira Nakamura, Kanagawa (JP); Yoshiaki Iwai, Tokyo (JP); Takayuki Yoshigahara, Tokyo (JP)

(73) Assignee: Sony Corporation, Tokyo (JP)

( * ) Notice: Subject to any disclaimer, the term of this patent is extended or adjusted under 35 U.S.C. 154(b) by 1140 days.

(21) Appl. No.: 12/261,190

(22) Filed: Oct. 30, 2008

(65) Prior Publication Data

US 2009/0141984 A1 Jun. 4, 2009

(30) Foreign Application Priority Data

Nov. 1, 2007 (JP) ................ P2007-285164

(51) Int. Cl.
*G06K 9/46* (2006.01)
(52) U.S. Cl. ......... 382/201; 345/419; 382/192; 382/278
(58) Field of Classification Search .................. 345/419, 345/664; 382/118, 154, 190, 199, 201
See application file for complete search history.

(56) References Cited

U.S. PATENT DOCUMENTS

| | | | | |
|---|---|---|---|---|
| 6,766,055 B2* | 7/2004 | Matsugu et al. | ............... | 382/173 |
| 7,627,178 B2* | 12/2009 | Suzuki et al. | ................. | 382/190 |
| 7,706,603 B2* | 4/2010 | Najafi et al. | ................... | 382/154 |
| 7,856,125 B2* | 12/2010 | Medioni et al. | ............... | 382/118 |
| 7,894,636 B2* | 2/2011 | Kozakaya | .................... | 382/154 |
| 8,050,491 B2* | 11/2011 | Vaidyanathan | ............... | 382/154 |
| 2006/0074653 A1* | 4/2006 | Mitari et al. | ................. | 704/240 |
| 2009/0103814 A1* | 4/2009 | Nakamura et al. | ........... | 382/201 |
| 2009/0141984 A1* | 6/2009 | Nakamura et al. | ........... | 382/201 |

FOREIGN PATENT DOCUMENTS

| | | |
|---|---|---|
| JP | 01-102688 | 4/1989 |
| JP | 2000-123186 | 4/2000 |
| JP | 2002-183667 | 6/2002 |
| JP | 2004-185264 | 7/2004 |
| JP | 2004-326693 | 11/2004 |
| JP | 2005-196678 | 7/2005 |
| JP | 2006-190201 | 7/2006 |
| JP | 2006-252272 | 9/2006 |

* cited by examiner

*Primary Examiner* — Gregory M Desire
(74) *Attorney, Agent, or Firm* — Finnegan, Henderson, Farabow, Garrett & Dunner, L.L.P.

(57) ABSTRACT

An information processing apparatus includes a model image obtaining unit configured to obtain a plurality of model images; a model image feature quantity extracting unit configured to extract feature quantities of the model images obtained by the model image obtaining unit; a matching unit configured to perform matching on the feature quantities of the model images extracted by the model image feature quantity extracting unit; and an identifying feature point extracting unit configured to extract, as a result of the matching performed by the matching unit, feature points having a low correlation with a predetermined model image in similar model images that are the model images having a predetermined number or more of the feature quantities that match feature quantities of the predetermined model image, the extracted feature points being regarded as identifying feature points used for identification of the respective similar model images.

17 Claims, 16 Drawing Sheets

INFORMATION PROCESSING APPARATUS, INFORMATION PROCESSING METHOD, IMAGE IDENTIFYING APPARATUS, IMAGE IDENTIFYING METHOD, AND PROGRAM

CROSS REFERENCES TO RELATED APPLICATIONS

The present invention contains subject matter related to Japanese Patent Application JP 2007-285164 filed in the Japanese Patent Office on Nov. 1, 2007, the entire contents of which are incorporated herein by reference.

BACKGROUND OF THE INVENTION

1. Field of the Invention

The present invention relates to an information processing apparatus, an information processing method, an image identifying apparatus, an image identifying method, and a program. More specifically, the present invention relates to an information processing apparatus, an information processing method, an image identifying apparatus, an image identifying method, and a program that are preferably used to perform a process of identifying an image.

2. Description of the Related Art

There is a texture-based general object recognizing method using local feature quantities (e.g., see Patent Document 1: Japanese Unexamined Patent Application Publication No. 2004-326693). In this method, model images are registered in advance for recognition, feature points are extracted from the model images and a query image input for the recognition, matching between local feature quantities around the feature points is performed, and a mismatch is removed by using geometrical constraint, whereby recognition is performed.

In this technique, feature points are extracted from the model images and the query image, local feature quantities around the feature points are described, matching between the feature quantities is performed, and an outlier (mismatch) is removed through Hough transform or RANSAC (random sample consensus). Then, an object in the query image is identified on the basis of the number of matching pairs remained after the outlier removal.

SUMMARY OF THE INVENTION

However, when a plurality of model images are similar to each other, e.g., when the model images are partly the same in texture, the use of the above-described general object recognizing method according to Patent Document 1 for determining match/mismatch of an object in the query image on the basis of the number of matching pairs can cause a recognition result of "match" with respect to a plurality of model images because matching pairs over a threshold are observed in the plurality of model images.

The present invention has been made in view of these circumstances and is directed to realizing correct recognition of an object even when a plurality of model images are similar to each other.

An information processing apparatus according to a first embodiment of the present invention is an information processing apparatus to generate information used to identify images. The information processing apparatus includes model image obtaining means for obtaining a plurality of model images; model image feature quantity extracting means for extracting feature quantities of the model images obtained by the model image obtaining means; matching means for performing matching on the feature quantities of the model images extracted by the model image feature quantity extracting means; and identifying feature point extracting means for extracting, as a result of the matching performed by the matching means, feature points having a low correlation with a predetermined model image in similar model images that are the model images having a predetermined number or more of the feature quantities that match feature quantities of the predetermined model image, the extracted feature points being regarded as identifying feature points used for identification of the respective similar model images.

The matching means may include outlier removing means for removing an outlier from a result of the matching performed on the feature quantities of the model images.

The information processing apparatus may further include first transforming means for performing affine transformation on the similar model images so that the similar model images conform to the predetermined model image. The identifying feature point extracting means may extract the identifying feature points by using the similar model images obtained through the transformation performed by the first transforming means.

The information processing apparatus may further include recognized image obtaining means for obtaining a recognized image; recognized image feature quantity extracting means for extracting feature quantities of the recognized image obtained by the recognized image obtaining means; and identifying means for identifying the similar model image corresponding to the recognized image by obtaining correlations in feature quantity between the similar model images and the recognized image in the identifying feature points extracted by the identifying feature point extracting means.

The information processing apparatus may further include second transforming means for performing affine transformation on the similar model images so that the similar model images conform to the recognized image. The identifying means may identify the similar model image corresponding to the recognized image by using the similar model images obtained through the transformation performed by the second transforming means.

The identifying feature points extracted by the identifying feature point extracting means may be classified into a first group and a second group, each of the model images being identified as a corresponding similar model image when having a larger number of matching pairs at the identifying feature points in the first group or when having a smaller number of matching pairs at the identifying feature points in the second group.

The identifying feature point extracting means may hierarchically extract the identifying feature points.

An information processing method according to the first embodiment of the present invention is an information processing method for an information processing apparatus to generate information used to identify images. The information processing method includes the steps of obtaining a plurality of model images; extracting feature quantities of the obtained model images; performing matching on the extracted feature quantities of the model images; and extracting, as a result of the matching, feature points having a low correlation with a predetermined model image in similar model images that are the model images having a predetermined number or more of the feature quantities that match feature quantities of the predetermined model image, the extracted feature points being regarded as identifying feature points used for identification of the respective similar model images.

A program according to the first embodiment of the present invention is a program that allows a computer to perform a process of generating information used to identify images, the program allowing the computer to perform a process including the steps of obtaining a plurality of model images; extracting feature quantities of the obtained model images; performing matching on the extracted feature quantities of the model images; and extracting, as a result of the matching, feature points having a low correlation with a predetermined model image in similar model images that are the model images having a predetermined number or more of the feature quantities that match feature quantities of the predetermined model image, the extracted feature points being regarded as identifying feature points used for identification of the respective similar model images.

In the first embodiment of the present invention, a plurality of model images are obtained, feature quantities of the obtained model images are extracted, matching on the extracted feature quantities of the model images is performed; and, as a result of the matching, feature points having a low correlation with a predetermined model image in similar model images that are the model images having a predetermined number or more of the feature quantities that match feature quantities of the predetermined model image are extracted as identifying feature points used for identification of the respective similar model images.

An image identifying apparatus according to a second embodiment of the present invention is an image identifying apparatus to store a plurality of model images and feature quantities of the model images, accept input of a recognized image, and identify the model image corresponding to the recognized image. The image identifying apparatus includes storage means for storing identifying feature points that are feature points having a low correlation among similar model images in the similar model images that are a plurality of the model images having a predetermined number or more of the feature quantities matching any of the other model images; recognized image obtaining means for obtaining the recognized image; recognized image feature quantity extracting means for extracting feature quantities of the recognized image obtained by the recognized image obtaining means; and identifying means for identifying the similar model image corresponding to the recognized image by obtaining correlations in feature quantity between the similar model images and the recognized image in the identifying feature points stored by the storage means.

The image identifying apparatus may further include transforming means for performing affine transformation on the similar model images so that the similar model images conform to the recognized image. The identifying means may identify the similar model image corresponding to the recognized image by using the similar model images obtained through the transformation performed by the transforming means.

The image identifying apparatus may further include matching means for performing matching of the feature quantities between the recognized image obtained by the recognized image obtaining means and the stored model images. As a result of the matching performed by the matching means, if there are a predetermined number or more of the model images having feature quantities of a predetermined threshold or more matching the recognized image, the identifying means may regard the predetermined number or more of the model images as the similar model images and identify the similar model image corresponding to the recognized image by obtaining correlations in feature quantity between the similar model images and the recognized image in the identifying feature points stored by the storage means.

The matching means may include outlier removing means for removing an outlier from a result of matching of the feature quantities among the model images.

The identifying feature points stored by the storage means may be classified into a first group and a second group, each of the model images being identified as a corresponding similar model image when having a larger number of matching pairs at the identifying feature points in the first group or when having a smaller number of matching pairs at the identifying feature points in the second group.

The identifying feature points stored by the storage means may have a hierarchical structure.

An image identifying method according to the second embodiment of the present invention is an image identifying method for an image identifying apparatus that includes a first storage unit to store a plurality of model images and feature quantities of the model images and a second storage unit to store identifying feature points that are feature points having a low correlation among similar model images in the similar model images that are a plurality of the model images having a predetermined number or more of the feature quantities matching any of the other model images, that accepts input of a recognized image, and that identifies the model image corresponding to the recognized image. The image identifying method includes the steps of obtaining the recognized image; extracting feature quantities of the obtained recognized image; and identifying the similar model image corresponding to the recognized image by obtaining correlations in feature quantity between the similar model images and the recognized image in the identifying feature points.

A program according to the second embodiment of the present invention is a program that allows a computer to perform a process of identifying a model image corresponding to an input recognized image by using information stored in a first storage unit to store a plurality of model images and feature quantities of the model images and a second storage unit to store identifying feature points that are feature points having a low correlation among similar model images in the similar model images that are a plurality of the model images having a predetermined number or more of the feature quantities matching any of the other model images. The program allows the computer to perform a process including the steps of obtaining the recognized image; extracting feature quantities of the obtained recognized image; and identifying the similar model image corresponding to the recognized image by obtaining correlations in feature quantity between the similar model images and the recognized image in the identifying feature points.

In the second embodiment of the present invention, a recognized image is obtained, feature quantities of the obtained recognized image are extracted; and the similar model image corresponding to the recognized image is identified by obtaining correlations in feature quantity between the similar model images and the recognized image in the identifying feature points.

A network means a mechanism having at least two apparatuses connected to each other and enabling transmission of information from on of the apparatuses to the other apparatus. The apparatuses performing communication via the network may be independent apparatuses or may be internal blocks constituting a single apparatus.

The communication includes wireless communication and wired communication, and also a combination of wireless and wired communications. That is, wireless communication may be performed in a certain section and wired communication may be performed in another section. Furthermore, communication from a first apparatus to a second apparatus may be performed with a wire, whereas communication from the second apparatus to the first apparatus may be performed without a wire.

A recognizing apparatus, an apparatus corresponding to an identifying feature point selecting unit, and an apparatus corresponding to a determining unit may be an independent apparatus or may be a block in the information processing apparatus.

According to the first embodiment of the present invention, identifying feature points that are feature points having a low correlation among similar model images in the similar model images that are a plurality of model images having a predetermined number or more of feature quantities matching any of the other model images can be extracted. By using the identifying feature points for identification, a model image can be correctly identified while maintaining a robust characteristic even when similar model images exist.

According to the second embodiment of the present invention, identification can be performed by using identifying feature points that are feature points having a low correlation among similar model images in the similar model images that are a plurality of model images having a predetermined number or more of feature quantities matching any of the other model images. Accordingly, a model image can be correctly identified while maintaining a robust characteristic even when similar model images exist.

DESCRIPTION OF THE PREFERRED EMBODIMENTS

Figure 1:
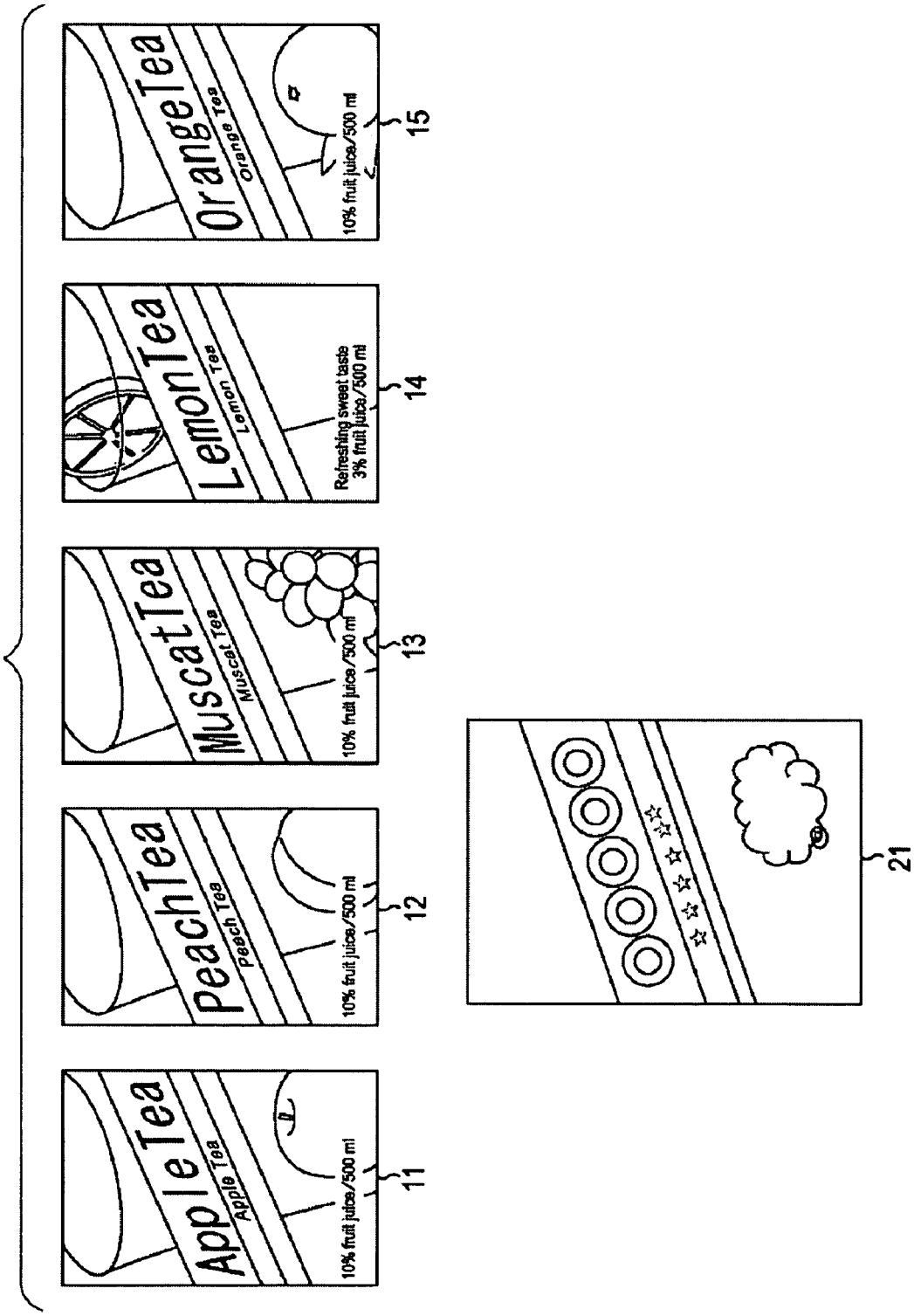
FIG. 1 illustrates similar model images.

Before describing embodiments of the present invention, the correspondence between the features of the claims and the specific elements in the embodiments of the present invention described in the specification or drawings is discussed below. This description is intended to assure that the embodiments supporting the claimed invention are described in the specification or drawings. Thus, even if an element in the following embodiments described in the specification or drawings is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

An information processing apparatus according to a first embodiment of the present invention is an information processing apparatus (e.g., the recognizing apparatus 51 in FIG. 2 or an apparatus corresponding to the identifying feature point selecting unit 61 in FIG. 2) to generate information used to identify images. The information processing apparatus includes model image obtaining means (e.g., the model image obtaining unit 71 in FIG. 2) for obtaining a plurality of model images; model image feature quantity extracting means (e.g., the feature quantity extracting unit 72 in FIG. 2) for extracting feature quantities of the model images obtained by the model image obtaining means; matching means (e.g., the matching unit 74 and the outlier removing unit 75 in FIG. 2) for performing matching on the feature quantities of the model images extracted by the model image feature quantity extracting means; and identifying feature point extracting means (e.g., the correlation image generating unit 78 and the identifying feature point extracting unit 79 in FIG. 2) for extracting, as a result of the matching performed by the matching means, feature points having a low correlation with a predetermined model image (e.g., a target model image) in similar model images that are the model images having a predetermined number or more of the feature quantities that match feature quantities of the predetermined model image, the extracted feature points being regarded as identifying feature points used for identification of the respective similar model images.

The matching means may include outlier removing means (e.g., the outlier removing unit 75) for removing an outlier from a result of the matching performed on the feature quantities of the model images.

Figure 2:
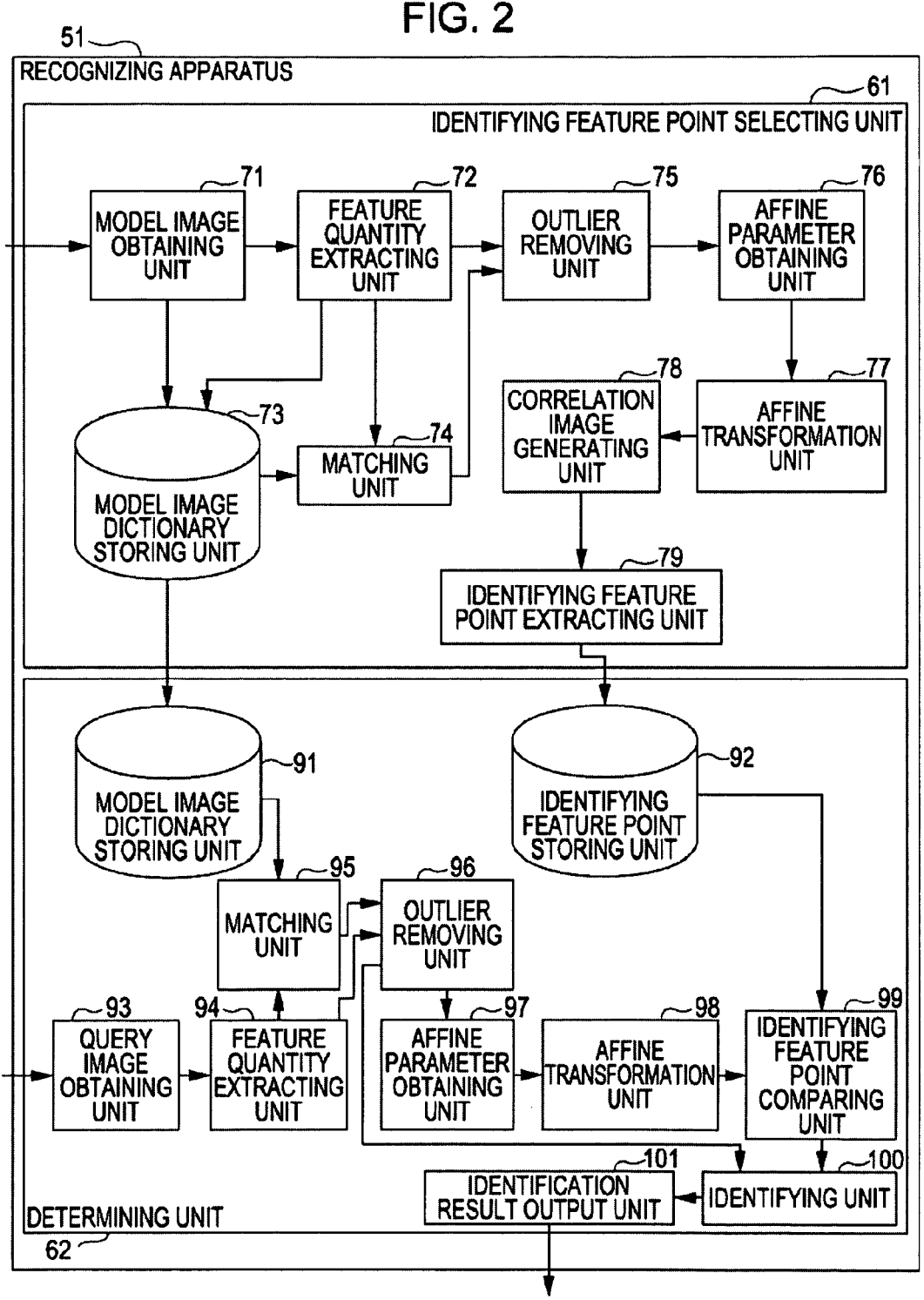
FIG. 2 is a block diagram illustrating a configuration of a recognizing apparatus.

The information processing apparatus may further include first transforming means (e.g., the affine parameter obtaining unit 76 and the affine transformation unit 77 in FIG. 2) for performing affine transformation on the similar model images so that the similar model images conform to the predetermined model image. The identifying feature point extracting means may extract the identifying feature points by using the similar model images obtained through the transformation performed by the first transforming means.

The information processing apparatus may further include recognized image obtaining means (e.g., the query image obtaining unit 93 in FIG. 2) for obtaining a recognized image (e.g., a query image); recognized image feature quantity extracting means (e.g., the feature quantity extracting unit 94 in FIG. 2) for extracting feature quantities of the recognized image obtained by the recognized image obtaining means; and identifying means (e.g., the identifying feature point comparing unit 99 and the identifying unit 100 in FIG. 2) for identifying the similar model image corresponding to the recognized image by obtaining correlations in feature quantity between the similar model images and the recognized image in the identifying feature points extracted by the identifying feature point extracting means.

The information processing apparatus may further include second transforming means (e.g., the affine parameter obtaining unit 97 and the affine transformation unit 98 in FIG. 2) for performing affine transformation on the similar model images so that the similar model images conform to the recognized image. The identifying means may identify the similar model image corresponding to the recognized image by using the similar model images obtained through the transformation performed by the second transforming means.

An information processing method according to the first embodiment of the present invention is an information processing method for an information processing apparatus (e.g., the recognizing apparatus 51 in FIG. 2 or an apparatus corresponding to the identifying feature point selecting unit 61 in FIG. 2) to generate information used to identify images. The information processing method includes the steps of obtaining a plurality of model images (e.g., step S11 in FIG. 13 or step S21 in FIG. 14); extracting feature quantities of the obtained model images (e.g., step S12 in FIG. 13 or step S22 in FIG. 14); performing matching on the extracted feature quantities of the model images (e.g., step S14 in FIG. 13 or step S24 in FIG. 14); and extracting, as a result of the matching, feature points having a low correlation with a predetermined model image (e.g., a target model image) in similar model images that are the model images having a predetermined number or more of the feature quantities that match feature quantities of the predetermined model image, the extracted feature points being regarded as identifying feature points used for identification of the respective similar model images (e.g., steps S15 to S19 in FIG. 13 or steps S28 to S31 in FIG. 14).

A program according to the first embodiment of the present invention is a program that allows a computer to perform a process of generating information used to identify images. The program allows the computer to perform a process including the steps of obtaining a plurality of model images (e.g., step S11 in FIG. 13 or step S21 in FIG. 14); extracting feature quantities of the obtained model images (e.g., step S12 in FIG. 13 or step S22 in FIG. 14); performing matching on the extracted feature quantities of the model images (e.g., step S14 in FIG. 13 or step S24 in FIG. 14); and extracting, as a result of the matching, feature points having a low correlation with a predetermined model image (e.g., a target model image) in similar model images that are the model images having a predetermined number or more of the feature quantities that match feature quantities of the predetermined model image, the extracted feature points being regarded as identifying feature points used for identification of the respective similar model images (e.g., steps S15 to S19 in FIG. 13 or steps S28 to S31 in FIG. 14).

An image identifying apparatus according to a second embodiment of the present invention is an image identifying apparatus (e.g., an apparatus corresponding to the determining unit 62 in FIG. 2) to store a plurality of model images and feature quantities of the model images, accept input of a recognized image, and identify the model image corresponding to the recognized image. The image identifying apparatus includes storage means (e.g., the identifying feature point storing unit 92 in FIG. 2) for storing identifying feature points that are feature points having a low correlation among similar model images in the similar model images that are a plurality of the model images having a predetermined number or more of the feature quantities matching any of the other model images; recognized image obtaining means (e.g., the query image obtaining unit 93 in FIG. 2) for obtaining the recognized image (e.g., a query image); recognized image feature quantity extracting means (e.g., the feature quantity extracting means 94 in FIG. 2) for extracting feature quantities of the recognized image obtained by the recognized image obtaining means; and identifying means (e.g., the identifying feature point comparing unit 99 and the identifying unit 100 in FIG. 2) for identifying the similar model image corresponding to the recognized image by obtaining correlations in feature quantity between the similar model images and the recognized image in the identifying feature points stored by the storage means.

The image identifying apparatus may further include transforming means (e.g., the affine parameter obtaining unit 97 and the affine transformation unit 98 in FIG. 2) for performing affine transformation on the similar model images so that the similar model images conform to the recognized image. The identifying means may identify the similar model image corresponding to the recognized image by using the similar model images obtained through the transformation performed by the transforming means.

The image identifying apparatus may further include matching means (e.g., the matching unit 95 and the outlier removing unit 96 in FIG. 2) for performing matching of the feature quantities between the recognized image obtained by the recognized image obtaining means and the stored model images. As a result of the matching performed by the matching means, if there are a predetermined number or more of the model images having feature quantities of a predetermined threshold or more matching the recognized image, the identifying means may regard the predetermined number or more of the model images as the similar model images and identify the similar model image corresponding to the recognized image by obtaining correlations in feature quantity between the similar model images and the recognized image in the identifying feature points stored by the storage means.

The matching means may include outlier removing means (e.g., the outlier removing unit 96 in FIG. 2) for removing an outlier from a result of matching of the feature quantities among the model images.

An image identifying method according to the second embodiment of the present invention is an image identifying method for an image identifying apparatus (e.g., an apparatus corresponding to the determining unit 62 in FIG. 2) that includes a first storage unit to store a plurality of model images and feature quantities of the model images and a second storage unit to store identifying feature points that are feature points having a low correlation among similar model images in the similar model images that are a plurality of the model images having a predetermined number or more of the feature quantities matching any of the other model images, that accepts input of a recognized image, and that identifies the model image corresponding to the recognized image. The image identifying method includes the steps of obtaining the recognized image (e.g., a query image) (e.g., step S41 in FIG. 15); extracting feature quantities of the obtained recognized image (e.g., step S42 in FIG. 15); and identifying the similar model image corresponding to the recognized image by obtaining correlations in feature quantity between the similar model images and the recognized image in the identifying feature points (e.g., steps S47 to S50 in FIG. 15).

A program according to the second embodiment of the present invention is a program that allows a computer to perform a process of identifying a model image corresponding to an input recognized image by using information stored in a first storage unit to store a plurality of model images and feature quantities of the model images and a second storage unit to store identifying feature points that are feature points having a low correlation among similar model images in the similar model images that are a plurality of the model images having a predetermined number or more of the feature quantities matching any of the other model images. The program allows the computer to perform a process including the steps of obtaining the recognized image (e.g., a query image) (e.g., step S41 in FIG. 15); extracting feature quantities of the obtained recognized image (e.g., step S42 in FIG. 15); and identifying the similar model image corresponding to the recognized image by obtaining correlations in feature quantity between the similar model images and the recognized image in the identifying feature points (e.g., steps S47 to S50 in FIG. 15).

Hereinafter, the embodiments of the present invention are described in detail with reference to the drawings.

For example, assume the case where there are images 11 to 15 illustrated in FIG. 1 as model images corresponding to a model to be identified. These images are different from each other but have basically the same shapes except the left-half area of characters printed in the part of double circles and stars shown in a simplified image 21, and the presence/absence or the type of a picture of a fruit printed in the part of a cloud shown in the simplified image 21.

Pieces of image data corresponding to the images 11 to 15 illustrated in FIG. 1 (hereinafter the pieces of image data are simply referred to as images 11 to 15) are registered as pieces of data corresponding to a model image (hereinafter the pieces of data are simply referred to as model images). For example, when the image corresponding to the image 11 is supplied as data corresponding to a query image (hereinafter the data corresponding to the query image is simply referred to as query image), only the image 11 should be extracted as an identification result. However, in the above-described technique according to the related art in which an object in a query image is identified on the basis of the number of matching pairs, an identification result of "match" is given to all the images 11 to 15, although it depends on the number of matching pairs for identification.

Particularly, when there are a wide variety of model images, if the threshold of the number of matching pairs is so high that the images 11 to 15 can be distinguished from each other, identification is performed too strictly. Accordingly, images that should be actually recognized as the same are more likely to be falsely recognized as different. However, as described above, it is difficult to correctly identify the images 11 to 15 in a threshold setting level in a typical matching process.

In view of the above-described circumstances, it is preferable to use the following method. That is, when there exist similar images like the images 11 to 15 illustrated in FIG. 1 at registration of model images, the correlation among those images is obtained and feature points in a dissimilar part are extracted. Accordingly, similar images like the images 11 to 15 illustrated in FIG. 1 can be identified by using a matching result in the dissimilar part in an identifying process.

FIG. 2 is a block diagram illustrating a configuration of a recognizing apparatus 51 capable of obtaining the correlation among similar images at registration of model images and using a matching result in a dissimilar part in an identifying process.

The recognizing apparatus 51 includes an identifying feature point selecting unit 61 and a determining unit 62. Here, descriptions are given on the assumption that the recognizing apparatus 51 is a single apparatus. Alternatively, each of the identifying feature point selecting unit 61 and the determining unit 62 may be configured as a single apparatus.

The identifying feature point selecting unit 61 includes a model image obtaining unit 71, a feature quantity extracting unit 72, a model image dictionary storing unit 73, a matching unit 74, an outlier removing unit 75, an affine parameter obtaining unit 76, an affine transformation unit 77, a correlation image generating unit 78, and an identifying feature point extracting unit 79.

The model image obtaining unit 71 obtains model images for an identifying process and supplies them to the model image dictionary storing unit 73 and the feature quantity extracting unit 72. The supplied model images include a set of very similar model images like the images 11 to 15 illustrated in FIG. 1, for example.

The feature quantity extracting unit 72 extracts feature points from the respective model images supplied from the model image obtaining unit 71, also extracts local feature quantities from peripheries of the feature points, and makes a vector description. The feature quantity extracting unit 72 supplies information of the extracted local feature quantities to the model image dictionary storing unit 73, the matching unit 74, and the outlier removing unit 75.

As feature points, pixels having a significant difference from nearby pixels may be extracted, or pixels containing many high-frequency components obtained by performing FFT (Fast Fourier transform) on image data may be extracted. Alternatively, feature points may be extracted in another method. As local feature quantities, Gabor Jet, Haar Wavelet, Gaussian Derivatives, or SIFT feature may be used.

The model image dictionary storing unit 73 stores the model images supplied from the model image obtaining unit 71 and local feature quantities corresponding to the respective model images supplied from the feature quantity extracting unit 72. The model images and the local feature quantities corresponding to the model images stored in the model image dictionary storing unit 73 are supplied to a model image dictionary storing unit 91 in the determining unit 62 and are used for matching with a query image.

The matching unit 74 performs matching between the local feature quantities supplied from the feature quantity extracting unit 72 and the local feature quantities of the respective model images currently stored in the model image dictionary storing unit 73 in a method of K-NN (k-Nearest Neighbor) or the like, so as to obtain matching pairs. Hereinafter, the model image of which local feature quantities are extracted latest in the feature quantity extracting unit 72 serves as a reference of a matching process and is called a target model image. The target model image is discriminated from the other model images that have already been stored in the model image dictionary storing unit 73 and that are used in comparison with the local feature quantities of the target model image in the matching unit 74.

Then, the matching unit 74 supplies the target model image, similar model images having a predetermined number or more of matching pairs with respect to the target model image, and information of the matching pairs to the outlier removing unit 75. For example, if the image 11 illustrated in FIG. 1 is supplied as a model image in the state where the images 12 to 15 illustrated in FIG. 1 have been stored in the model image dictionary storing unit 73, the images 12 to 15 are extracted as similar model images having the predetermined number or more of matching pairs with respect to the image 11 as a target model image.

The matching unit 74 obtains matching pairs by using local feature quantities, so that matching can be correctly performed even if the target model image and the respective model images compared with the target model image have been captured from different viewpoints or even if the images have difference sizes.

The outlier removing unit 75 removes mismatching pairs not satisfying geometric constraint from the matching pairs detected by the matching unit 74 by using Hough transform or RANSAC (random sample consensus), for example. The outlier removal may be performed by using any method other than the above-described techniques. The outlier removing unit 75 supplies the target model image, the similar model images having the predetermined number or more of matching pairs with respect to the target model image, and information of the matching pairs obtained through the outlier removal to the affine parameter obtaining unit 76.

The affine parameter obtaining unit 76 obtains affine parameters of the respective similar model images with respect to the target model image on the basis of the remaining matching pairs. Affine transformation is transformation of allowing shear deformation to similarity transformation including translation and rotation (Euclidean transformation) and scaling transformation. That is, geometrical characteristics are maintained in the affine transformation: points aligned on a straight line in an original figure are also aligned on a straight line after transformation, and parallel lines are also parallel lines after transformation. That is, the affine parameter obtaining unit 76 obtains affine parameters for rotation, scaling, shear deformation, translation, and so on to correct distortion of similar model images if the target model image and the similar model images have been captured from different viewpoints or if the sizes of those images are different, thereby correcting the similar model images to images captured in the same size from the same imaging direction corresponding to the target model image.

The affine parameter obtaining unit 76 supplies the calculated affine parameter to the affine transformation unit 77, in addition to the target model image, the similar model images having the predetermined number or more of matching pairs with respect to the target model image, and information of the matching pairs obtained through the outlier removal.

The affine transformation unit 77 transforms the supplied similar model images by using the affine parameters so as to correct the similar model images to images captured in the same size from the same imaging direction corresponding to the target model image. Then, the affine transformation unit 77 supplies the target model image, the similar model images obtained through the affine transformation having the predetermined number or more of matching pairs with respect to the target model image, and information of the matching pairs obtained through the outlier removal to the correlation image generating unit 78.

The correlation image generating unit 78 calculates correlation values of feature quantities (feature quantity distances) between the target model image and the similar model images obtained through the affine transformation at the respective feature points in the target model image, and supplies the correlation values of the respective feature points to the identifying feature point extracting unit 79. By correlating the correlation values obtained here onto images, correlation images showing the correlation between the target model image and the respective similar model images can be generated.

The identifying feature point extracting unit 79 extracts feature points having a correlation value lower than a threshold or a predetermined number of feature points in increasing order of correlation value on the basis of the correlation values at the respective feature points of the target model image between the target model image and the similar model images. The extracted feature points are regarded as identifying feature points that are useful to identification from the similar model images and are supplied to an identifying feature point storing unit 92 in the determining unit 62.

Figure 3:
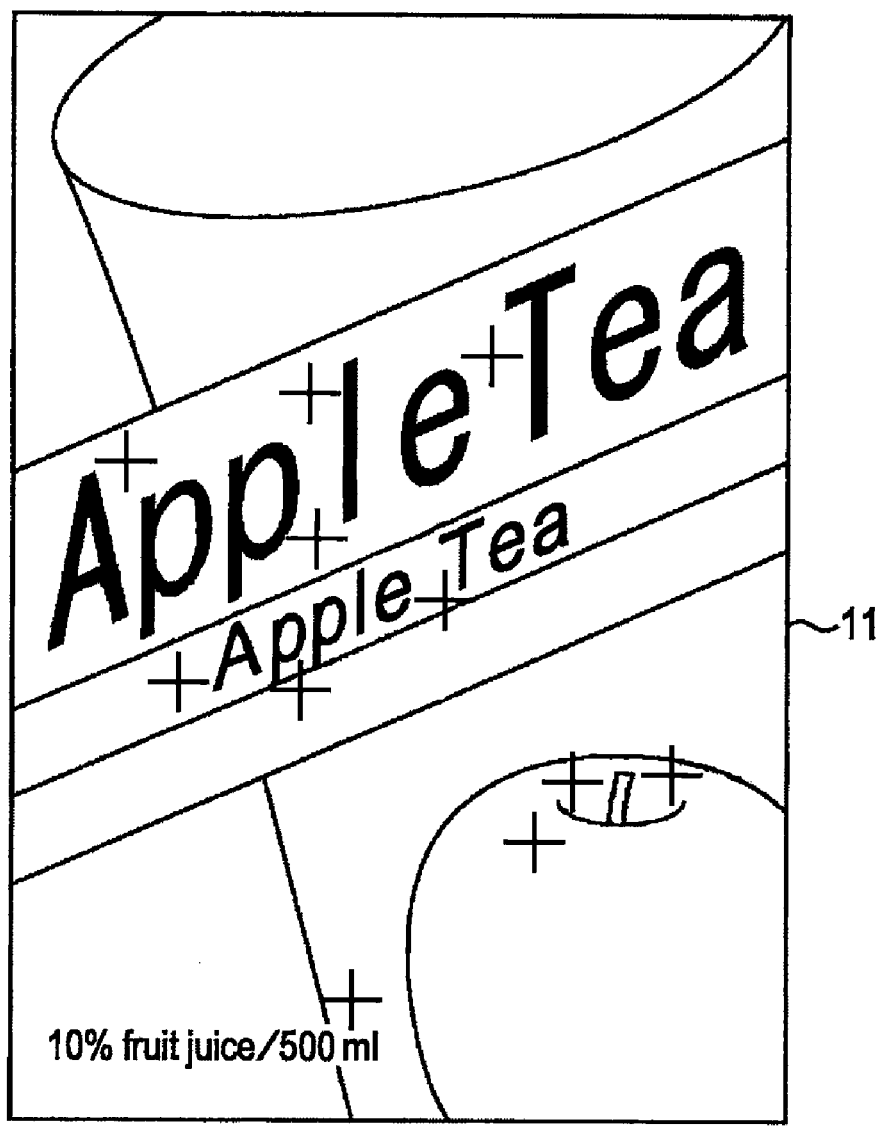
FIG. 3 illustrates identifying feature points.

For example, assume that the image 11 illustrated in FIG. 1 is supplied as a model image in the state where the images 12 to 15 illustrated in FIG. 1 or images transformed to the images 12 to 15 by affine transformation have been stored in the model image dictionary storing unit 73. In this case, the images 12 to 15 illustrated in FIG. 1 or images corresponding thereto are extracted as similar model images with respect to the image 11 as a target model image. Then, the correlation image generating unit 78 obtains correlation values of feature quantities at the feature points of the target model image between the target model image 11 and the similar model images 12 to 15 obtained through the affine transformation. Then, the identifying feature point extracting unit 79 extracts feature points having a low correlation value, as illustrated in FIG. 3 for example.

For example, if the image 12 among the images 12 to 15 illustrated in FIG. 1 is supplied first as a model image to the identifying feature point selecting unit 61, the image 12 is registered as a similar model image with respect to the images 13 to 15. However, the image 12 is not processed as a model image having a similar image, and thus no identifying feature point of the image 12 may be extracted. Thus, when the matching unit 74 detects a similar model image having a predetermined number or more of matching pairs, if no similar model image is correlated to the model image detected as a similar model image, it is preferable to perform a process of detecting identifying feature points by inverting the target model image and the similar model image.

Instead of sequentially performing the above-described process on each of input model images, a set of similar model images may be generated in advance and identifying feature points may be extracted on the basis of an average of all correlation values of combinations of the images included in the set.

In such a case, matching pairs are obtained through a matching process performed on the images 11 to 15 illustrated in FIG. 1 by the matching unit 74 and an outlier of the matching pairs is removed by the outlier removing unit 75, whereby the images 11 to 15 are extracted as a set of similar model images.

Then, the affine parameter obtaining unit 76 obtains affine parameters of all combinations. The affine transformation unit 77 performs affine transformation of the respective combinations. Then, the correlation image generating unit 78 generates correlation images in all the combinations and calculates the average value thereof. Then, the identifying feature point extracting unit 79 can extract identifying feature points that are useful to identification from similar model images: feature points having a correlation value lower than a threshold or a predetermined number of feature points in increasing order of correlation value on the basis of the average value of the correlation images, and supply the identifying feature points to the identifying feature point storing unit 92 in the determining unit 62.

The determining unit 62 in the recognizing apparatus 51 illustrated in FIG. 2 includes the model image dictionary storing unit 91, the identifying feature point storing unit 92, a query image obtaining unit 93, a feature quantity extracting unit 94, a matching unit 95, an outlier removing unit 96, an affine parameter obtaining unit 97, an affine transformation unit 98, an identifying feature point comparing unit 99, an identifying unit 100, and an identification result output unit 101.

The model image dictionary storing unit 91 receives model images and local feature quantities corresponding to the model images from the model image dictionary storing unit 73 and stores them.

The identifying feature point storing unit 92 receives, from the identifying feature point extracting unit 79, information of identifying feature points that are feature points having a low correlation value with respect to similar model images in the above-described target model image having similar model images, and stores the information.

The query image obtaining unit 93 obtains a query image as a target of identification.

The feature quantity extracting unit 94 extracts feature points from the query image supplied from the query image obtaining unit 93, extracts local feature quantities from peripheries of the feature points, and makes a vector description. The method for extracting the feature points and feature quantities is the same as that in the feature quantity extracting unit 72. The feature quantity extracting unit 94 supplies information of the extracted local feature quantities to the matching unit 95 and the outlier removing unit 96.

Figure 4:
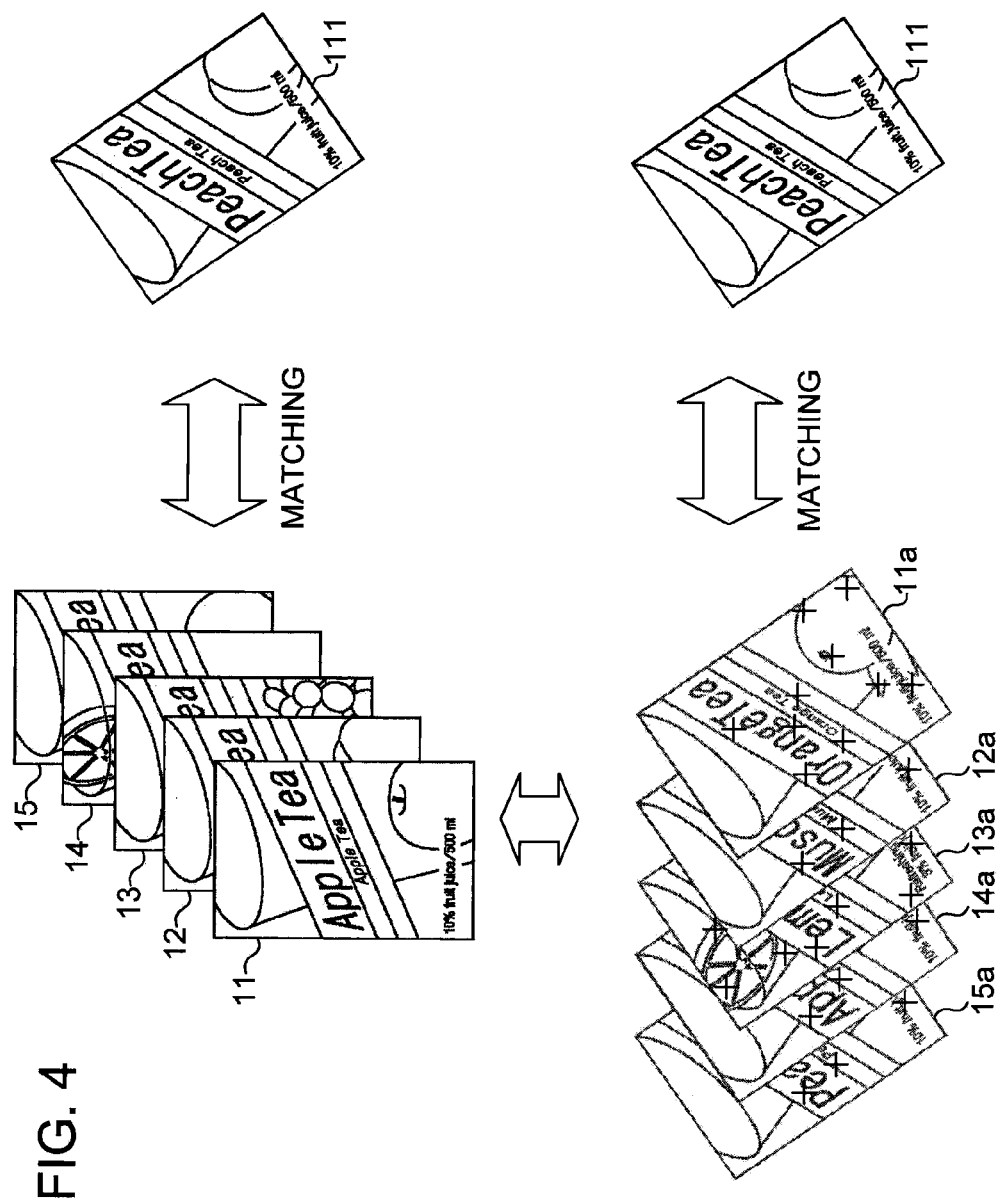
FIG. 4 illustrates identification of a query image.

The matching unit 95 performs matching between the local feature quantities supplied from the feature quantity extracting unit 94 and the local feature quantities corresponding to model images stored in the model image dictionary storing unit 91 by using the K-NN method or the like, so as to obtain matching pairs. Then, the matching unit 95 supplies the query image, data of model images having a predetermined number or more of matching pairs with respect to the query image, and information of the matching pairs to the outlier removing unit 96. For example, if a query image 111 illustrated in FIG. 4 is supplied in the state where the images 11 to 15 illustrated in FIG. 1 are stored as model images in the model image dictionary storing unit 91, the matching unit 95 extracts the images 11 to 15 as model images that are likely to be an identification target, and supplies the images to the outlier removing unit 96.

The outlier removing unit 96 removes mismatching pairs not satisfying geometric constraint from the matching pairs detected by the matching unit 95 by using Hough transform or RANSAC. If there exists no model image having remaining matching pairs of which number is larger than a predetermined threshold, the outlier removing unit 96 supplies the result to the identifying unit 100. If the number of model images having remaining matching pairs whose number is larger than the predetermine threshold is smaller than a predetermined number, the outlier removing unit 96 supplies the remaining model images and the number of matching pairs to the identifying unit 100. If the number of model images having remaining matching pairs whose number exceeds the predetermined threshold is equal to or larger than the predetermined number, it is determined that the model images having remaining matching pairs whose number is larger than the predetermined threshold are the above-described similar model images. The outlier removing unit 96 supplies the similar model images, the query image, and information of the matching pairs obtained through the outlier removal to the affine parameter obtaining unit 97.

The affine parameter obtaining unit 97 obtains affine parameters of the respective similar model images with respect to the query image on the basis of the remaining matching pairs and supplies the query image, the affine parameters, the similar model images having remaining matching pairs whose number is larger than the predetermined threshold, and information of the matching pairs obtained through the outlier removal to the affine transformation unit 98.

The affine transformation unit 98 transforms the supplied similar model images by using the affine parameters so as to correct the similar model images to images captured in the same size from the imaging direction corresponding to the query image. As illustrated in FIG. 4, if the images 11 to 15 are extracted as similar model images of the query image 111, the images 11 to 15 are transformed to images 11a to 15a by the affine transformation unit 98. The affine transformation unit 98 supplies the query image, the similar model images obtained through the affine transformation, and information of the matching pairs obtained through the outlier removal to the identifying feature point comparing unit 99.

The identifying feature point comparing unit 99 obtains identifying feature points in the similar model images obtained through the affine transformation and calculates the feature quantities thereof on the basis of the identifying feature points of the respective model images stored in the identifying feature point storing unit 92, and also calculates correlation values between the feature quantities in the obtained identifying feature points and the feature quantities in the identifying feature points on the query image. That is, the identifying feature point comparing unit 99 calculates the correlation values between the feature quantities in the identifying feature points of the images 11a to 15a obtained through the affine transformation illustrated in FIG. 4 and the feature quantities in the identifying feature points of the query image 111. Then, the identifying feature point comparing unit 99 supplies the calculation result of the correlation values to the identifying unit 100.

The identifying unit 100 performs an identifying process on the basis of the information supplied from the outlier removing unit 96 or the identifying feature point comparing unit 99. That is, if it is detected in the outlier removing unit 96 that the number of similar model images having matching pairs remained after the outlier removal whose number is larger than a predetermined threshold is smaller than a predetermined number, the identifying unit 100 identifies that the query image corresponds to the model image having the largest number of matching pairs or one or more model images having matching pairs whose number is larger than the predetermined threshold on the basis of the number of matching pairs supplied from the outlier removing unit 96, and outputs the identification result to the identification result output unit 101. If the identifying unit 100 is notified from the outlier removing unit 96 that there exists no similar model image having remaining matching pairs whose number is larger than the predetermined threshold, the identifying unit 100 determines that the query image does not match any model image and outputs the determination result to the identification result output unit 101.

If it is detected in the outlier removing unit 96 that the number of similar model images having-matching pairs remained after the outlier removal whose number exceeds the predetermined threshold is equal to or larger than the predetermined number, the identifying unit 100 receives, from the identifying feature point comparing unit 99, correlation values of the feature quantities in the identifying feature points between the similar model images and the query image. The identifying unit 100 identifies that the query image corresponds to the similar model image having the highest average value of the correlation values in the identifying feature points or one or more similar model images having an average value higher than a predetermined threshold on the basis of the correlation values of the feature quantities supplied thereto, and outputs the identification result to the identification result output unit 101.

The identification result output unit 101 displays the identification result supplied from the identifying unit 100 in a display unit or outputs the identification result as voice data. Alternatively, the identification result output unit 101 outputs the identification result through a predetermined transmission path or records the identification result on a predetermined recording medium, so as to output the result to another apparatus.

The process of identifying similar images in the recognizing apparatus 51 can be applied to identification of images having almost the same form and size but are different only in characters, e.g., tickers in the same program in television broadcasting or the like.

Figure 5:
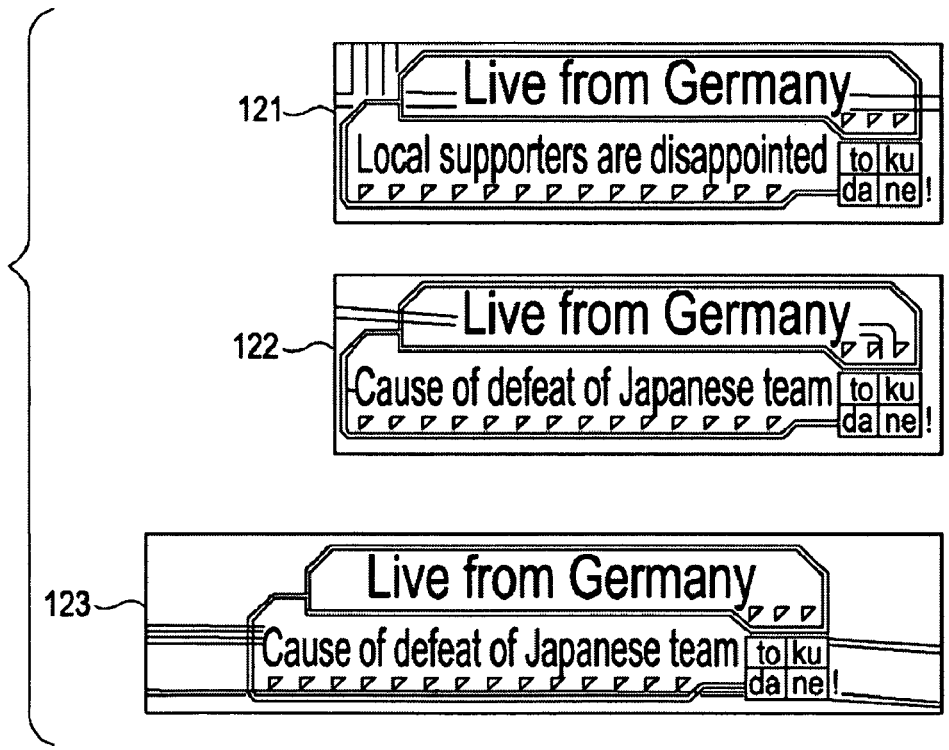
FIG. 5 illustrates application to tickers.

A description is given below about the case where a #1 model image 121 and a #2 model image 122 are compared with a query image 123 illustrated in FIG. 5, for example.

The #2 model image 122 should be determined to be the same as the query image 123. The #1 model image 121 is almost the same as the #2 model image 122 in form and size and is different only in characters.

Figure 6:
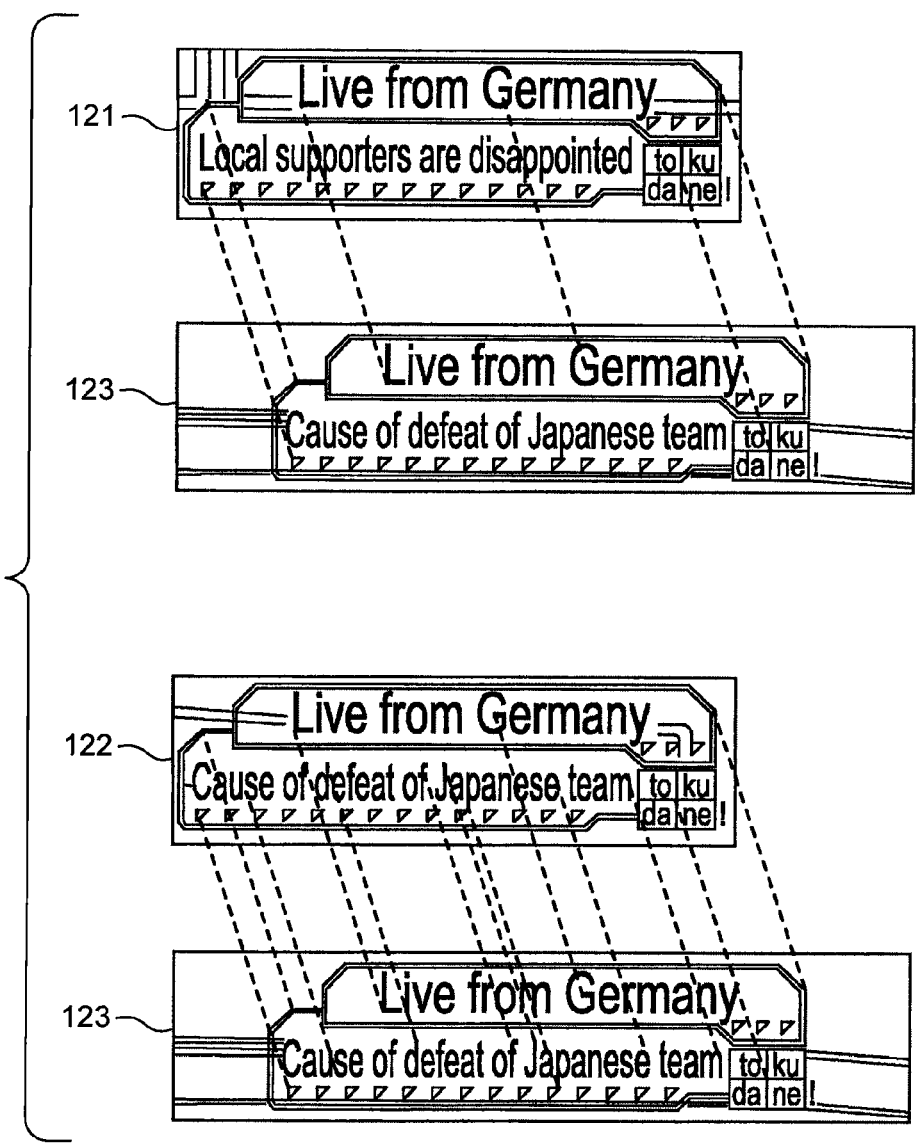
FIG. 6 illustrates application to tickers.

Thus, if the #1 model images 121 and the #2 model image 122 are registered as model images and if the query image 123 is supplied, only the #2 model image 122 should be extracted as an identification result. However, in the above-described related art where an object in a query image is identified on the basis of the number of matching pairs, a predetermined number or more of matching pairs are extracted from both the #1 model image 121 and the #2 model image 122 as illustrated in FIG. 6, so that an identification result of "match" is given to the model images 121 and 122.

Therefore, the above-described identifying feature point selecting unit 61 extracts identifying feature points of the #1 model image 121 and the #2 model image 122.

Figure 7:
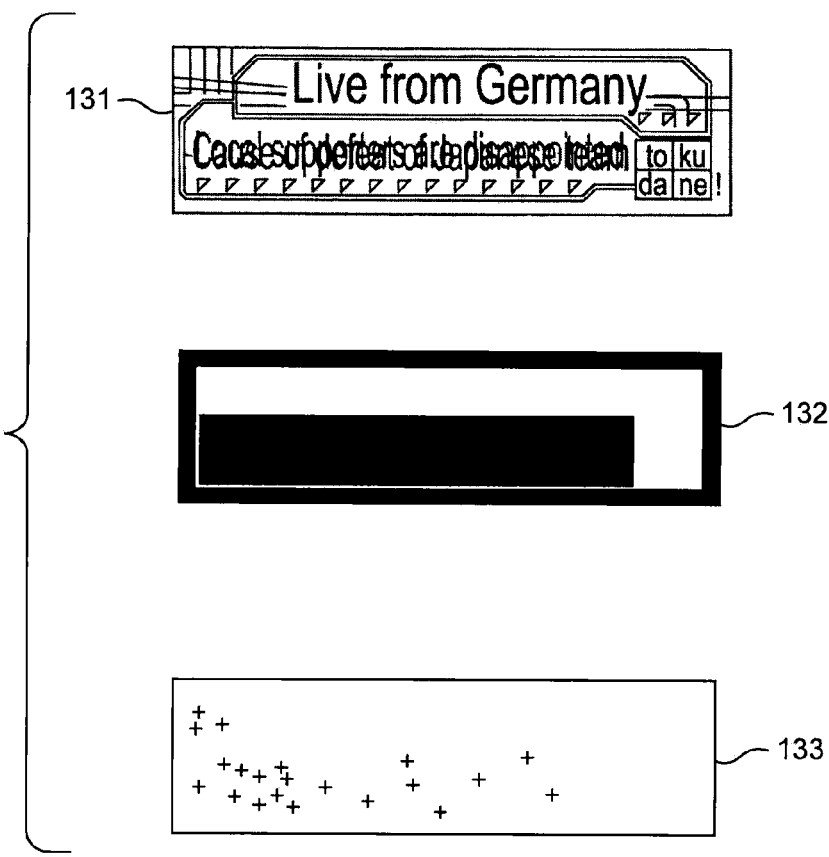
FIG. 7 illustrates application to tickers.

An image 131 illustrated in FIG. 7 is generated by overlaying the #1 model image 121 and the #2 model image 122 that have been affine-transformed, one of the images 121 and 122 being a target model image and the other being a similar model image. As can be understood from the image 131, the #1 model image 121 and the #2 model image 122 are almost the same except that the character portions are different: "local supporters are disappointed" and "cause of defeat of Japanese team".

An image 132 illustrated in FIG. 7 is a correlation image between the #1 model image 121 and the #2 model image 122. In the image 132, a portion of a strong correlation is white and a portion of a weak correlation is black.

An image 133 illustrated in FIG. 7 shows identifying feature points obtained from the #1 model image 121 and the #2 model image 122. The identifying feature point storing unit 92 in the determining unit 62 illustrated in FIG. 2 stores the identifying feature points shown in the image 133.

As described above with reference to FIG. 6, in the above-described related art where an object in a query image is identified on the basis of the number of matching pairs, a predetermined number or more of matching pairs are extracted from both the #1 model image 121 and the #2 model image 122 with respect to the query image 123, and thus both the images can be identified as images corresponding to the query image 123. On the other hand, the determining unit 62 illustrated in FIG. 2 obtains correlation values of the #1 model image 121 and the #2 model image 122 at the identifying feature points shown in the image 133 illustrated in FIG. 7 and performs an identifying process on the basis of the correlation values. Accordingly, the determining unit 62 can correctly determine that the image corresponding to the query image 123 is the #2 model image 122.

That is, the determining unit 62 illustrated in FIG. 2 makes a determination by using many identifying feature points included in the portions of "local supporters are disappointed" and "cause of defeat of Japanese team" in the #1 model image 121 and the #2 model image 122, and is thus capable of correctly determining that the image corresponding to the query image 123 is the #2 model image 122.

For example, when the similarity among model images is represented by a hierarchical structure, e.g., there are N model images in which the cloud portions are similar to each other in the simplified image 21 illustrated in FIG. 1, the N model images can be classified into "a" model images and "b" model images on the basis of the part of double circles, and the "b" model images can be completely classified on the basis of the part of stars, or when there are a plurality of similar portions among the model images, determination of the similar model images can be performed by discriminating identifying feature points or by using hierarchized identifying feature points.

A description is given below with reference to FIG. 8 about the case where #11 model image 161 to #14 model image 164 are stored as similar model images in the model image dictionary storing unit 91 in the determining unit 62 to which a query image 151 has been input.

Each of the #11 model image 161 to the #14 model image 164 has a similar portion with respect to the query image 151. Thus, in the above-described related art where an object in a query image is identified on the basis of the number of matching pairs, all the #11 model image 161 to the #14 model image 164 can be identified as images corresponding to the query image 151.

Figure 9:
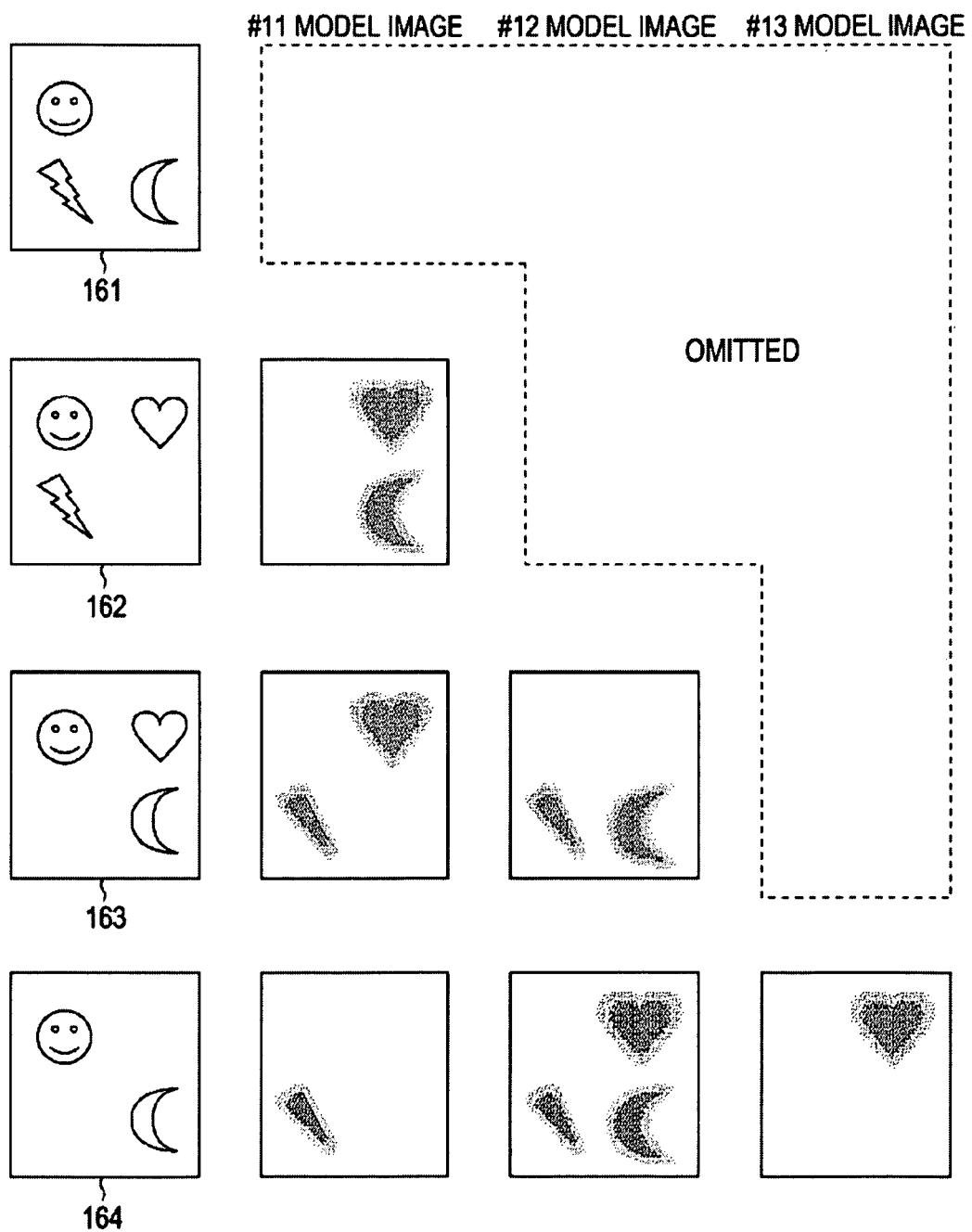
FIG. 9 illustrates an example of similar model images having different similar points.

Each of the #11 model image 161 to the #14 model image 164 has a similar portion and a dissimilar portion. FIG. 9 illustrates respective correlation images of the #11 model image 161 to the #14 model image 164. In the correlation images illustrated in FIG. 9, a portion of a strong correlation is white and a portion of a weak correlation is black.

A different portion between the #11 model image 161 and the #12 model image 162 is a heart mark at the upper-right and a crescent mark at the lower-right. A different portion between the #11 model image 161 and the #13 model image 163 is a heart mark at the upper-right and a lightning mark at the lower-left. A different portion between the #11 model image 161 and the #14 model image 164 is a lightning mark at the lower-left. A different portion between the #12 model image 162 and the #13 model image 163 is a crescent mark at the lower-right and a lightning mark at the lower-left. A different portion between the #12 model image 162 and the #14 model image 164 is a heart mark at the upper-right, a crescent mark at the lower-right, and a lightning mark at the lower-left. A different portion between the #13 model image 163 and the #14 model image 164 is a heart mark at the upper-right.

In the #11 model image 161 to the #14 model image 164 as similar model images, the smile mark at the upper-left is the same in every image and thus no identifying feature point exists there. On the other hand, a portion with no mark has a few features as a model image, and thus no feature point is extracted from the portion with no mark in the query image and the model images. In other words, if there exists a matching pair of feature quantities in a portion with no mark between the query image and a model image, it can be estimated that the query image and the model image are not similar to each other.

In the #11 model image 161 to the #14 model image 164, a portion with a mark other than the smile mark at the upper-left has a remarkable feature as a model image. Thus, if there exists a matching pair of feature quantities in this portion between the query image and a model image, it can be estimated that the query image and the model image are similar to each other.

Figure 10:
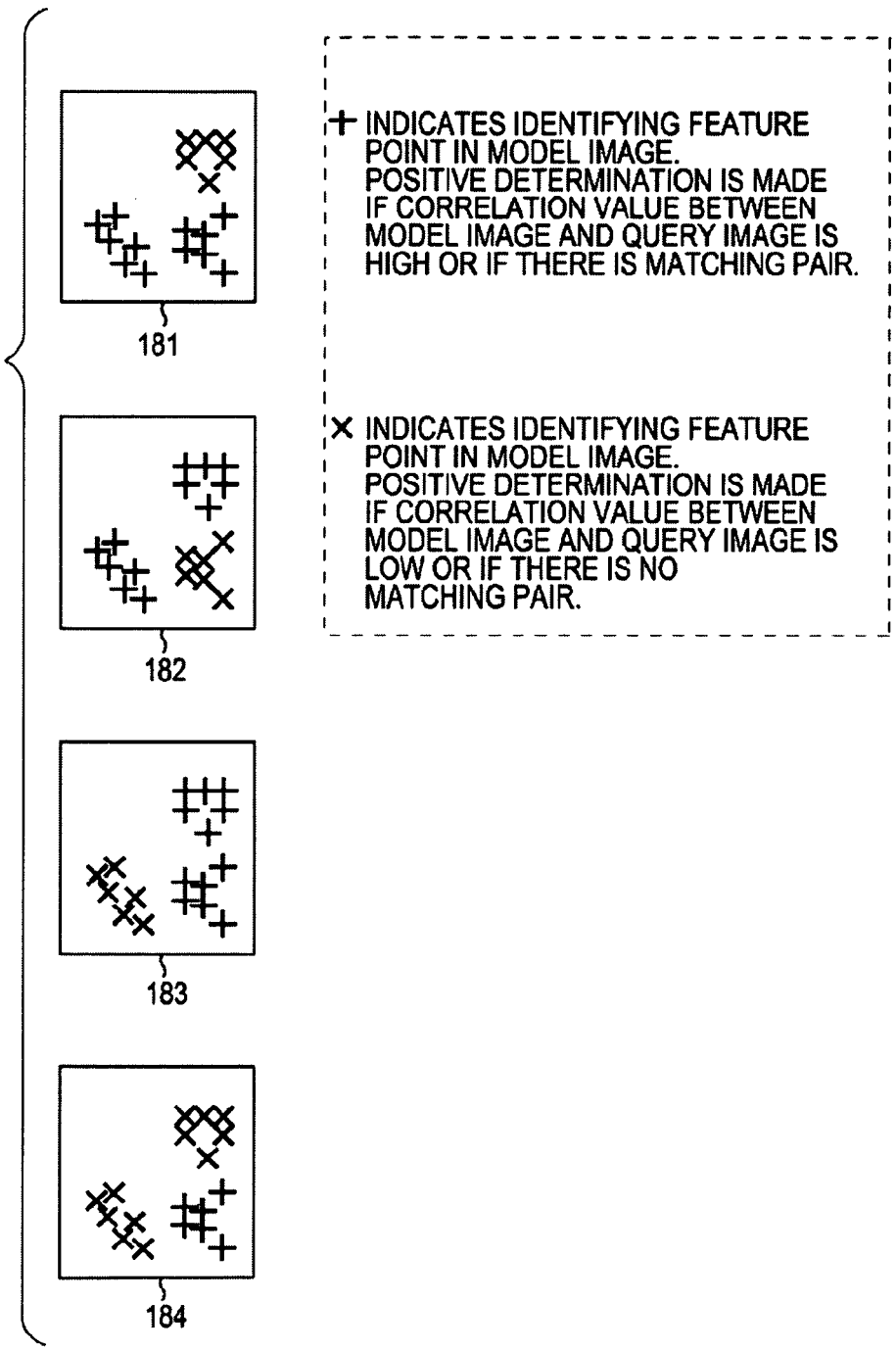
FIG. 10 illustrates classification of identifying feature points.

Therefore, the identifying feature point extracting unit 79 in the identifying feature point selecting unit 61 classifies identifying feature points into two classes as illustrated in FIG. 10. In FIG. 10, a point indicated with "+" is an identifying feature point where a positive determination of estimating that a query image is similar to a model image is made if a correlation value between the model image and the query image is high, that is, if there is a matching pair at the corresponding feature points. On the other hand, a point indicated with "x" is an identifying feature point where a positive determination of estimating that a query image is similar to a model image is made if a correlation value between the model image and the query image is low, that is, if there is no matching pair at the corresponding feature points.

In FIG. 10, identifying feature points 181 are classified identifying feature points of the #11 model image 161, identifying feature points 182 are classified identifying feature points of the #12 model image 162, identifying feature points 183 are classified identifying feature points of the #13 model image 163, and identifying feature points 184 are classified identifying feature points of the #14 model image 164.

By using such classified identifying feature points, the determining unit 62 can perform an identifying process by discriminating important and unimportant portions for identification from each other even if similar model images have different similar portions.

That is, by using the identifying feature points 181 to 184 illustrated in FIG. 10, the identifying feature point comparing unit 99 in the determining unit 62 to calculate correlation values at the identifying feature points can detect that the correlation values at the identifying feature points 181 between the #11 model image 161 and the query image are positive only at the lower-right, that the correlation values at the identifying feature points 182 between the #12 model image 162 and the query image are positive only at the upper-right, that the correlation values at the identifying feature points 183 between the #13 model image 163 and the query image are positive at the lower-left, upper-right, and lower-right, and that the correlation values at the identifying feature points 184 between the #14 model image 164 and the query image are positive at the lower-right and lower-left. Accordingly, it is determined that the model image corresponding to the query image 151 is the #13 model image 163.

Next, a description is given about the case of determining a similar model image by hierarchically classifying identifying feature points.

Figure 11:
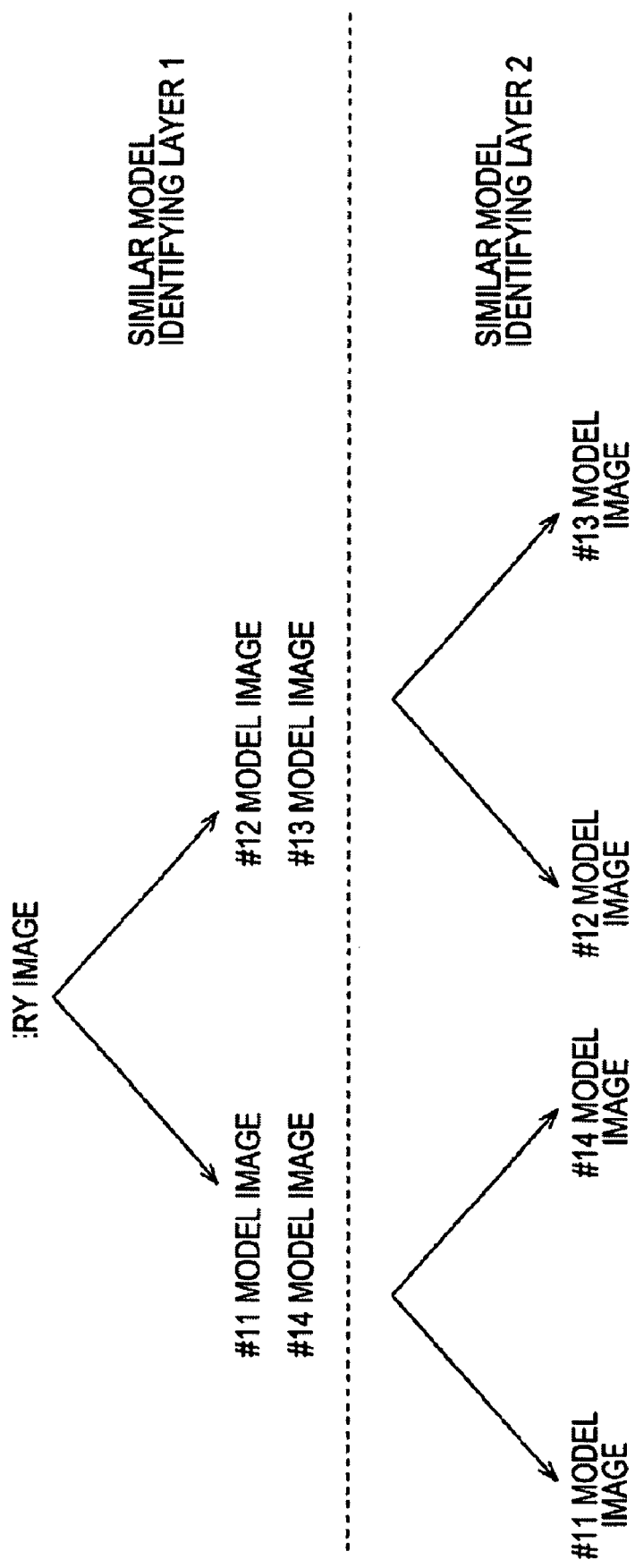
FIG. 11 illustrates a case of hierarchically classifying similar images.

The identifying feature point extracting unit 79 in the identifying feature point selecting unit 61 classifies similar model images into a plurality of classes and further classifies the similar model images in each class into classes. In this way, a hierarchical structure is established so that the individual similar models can be eventually discriminated from each other. Here, as illustrated in FIG. 11, the #11 model image 161 to #14 model image 164 illustrated in FIG. 8 are classified in two layers. The first layer is similar model identifying layer 1 to classify the four similar models into two similar model groups, and the second layer is similar model identifying layer 2 to classify the similar models into individual similar model images. When the number of similar model images is large, the number of similar model identifying layers is also large.

First, the identifying feature point extracting unit 79 in the identifying feature point selecting unit 61 selects a group of identifying feature points suitable for identifying certain model groups and holds the selected group as layer-1 model identifying feature points. For example, the #11 model image 161 to #14 model image 164 illustrated in FIG. 8 are classified into two model groups: the #11 model image 161 and the #14 model image 164 are classified into one of the groups; and the #12 model image 162 and the #13 model image 163 are classified into the other group. These two model groups can be identified most appropriately on the basis of presence/absence of the heart mark at the upper-right, and thus the part of the heart mark at the upper-right is set as the layer-1 model identifying feature points. Then, the identifying feature point comparing unit 99 makes a positive determination of estimating that the query image is similar to the model image if the correlation value at the upper-right between the #12 model image 162 or the #13 model image 163 and the query image is high, that is, if there is a matching pair. Also, the identifying feature point comparing unit 99 performs a positive determination of estimating that the query image is similar to the model image if the correlation value at the upper-right between the #11 model image 161 or the #14 model image 164 and the query image is low, that is, if there is no matching pair.

Then, the identifying feature point extracting unit 79 in the identifying feature point selecting unit 61 selects identifying feature points with which the plurality of model images included in the respective model group can be further classified and holds the selected feature points as layer-2 model identifying feature points. The #11 model image 161 and the #14 model image 164 can be identified most appropriately and the #12 model image 162 and the #13 model image 163 can be identified most appropriately on the basis of presence/absence of the lightening mark at the lower-left, and thus the part of the lightening mark at the lower-left is set as the layer-2 model identifying feature points. Then, the identifying feature point comparing unit 99 makes a positive determination of estimating that the query image is similar to the model image if the correlation value at the lower-left between the #11 model image 161 or the #12 model image 162 and the query image is high, that is, if there is a matching pair. Also, the identifying feature point comparing unit 99 makes a positive determination of estimating that the query image is similar to the model image if the correlation value at the lower-left between the #13 model image 163 or the #14 model image 164 and the query image is low, that is, if there is no matching pair.

Figure 8:
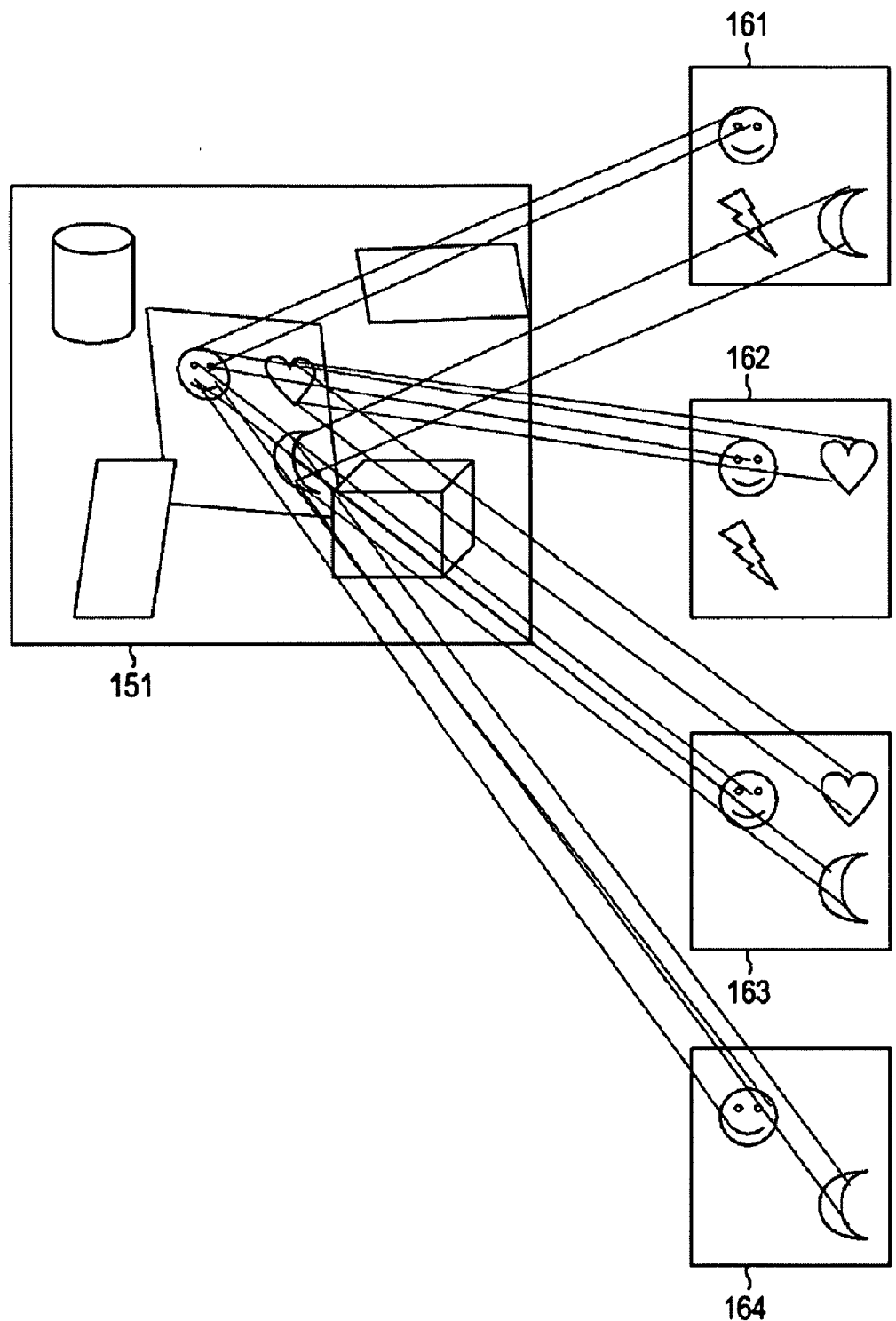
FIG. 8 illustrates an example of similar model images having different similar points.
Figure 12:
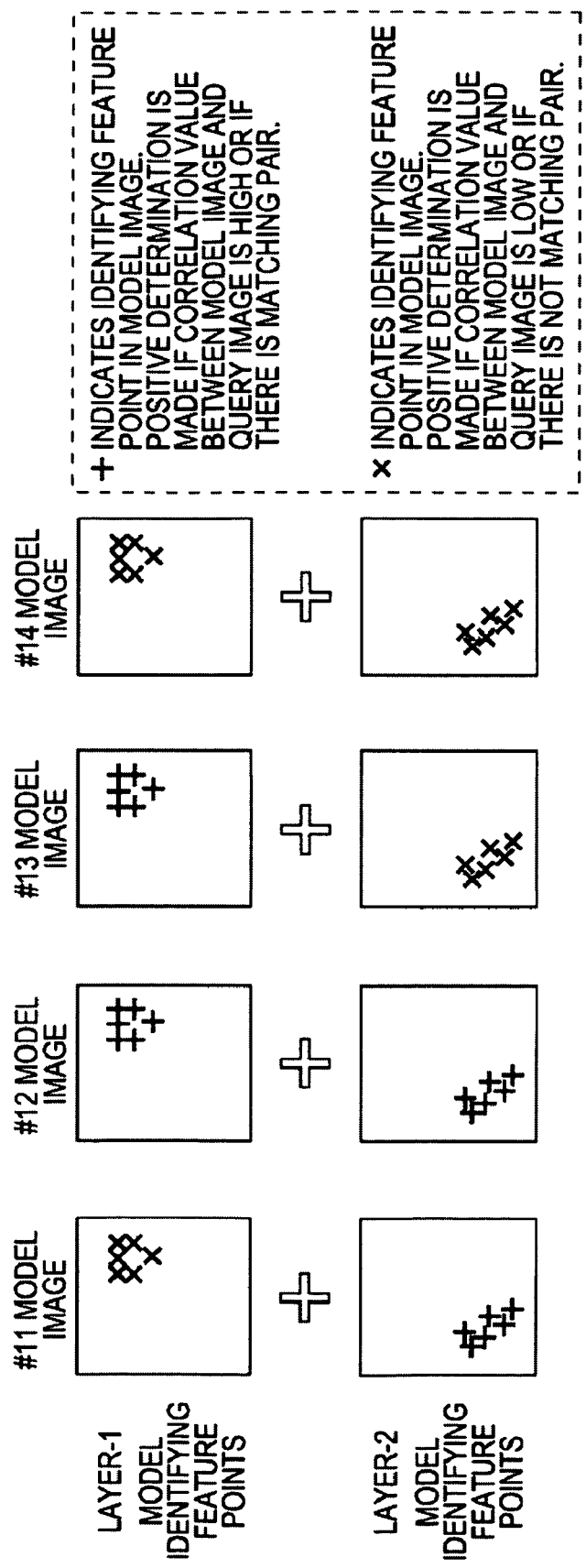
FIG. 12 illustrates a case of hierarchically classifying similar images.

In the #11 model image 161 to #14 model image 164 illustrated in FIG. 8, the layer-1 model identifying feature points and the layer-2 model identifying feature points based on the hierarchical structure illustrated in FIG. 11 are as illustrated in FIG. 12. In FIG. 12, too, a point indicated with "+" is an identifying feature point where a positive determination of estimating that a query image is similar to a model image is made if a correlation value between the model image and the query image is high, that is, if there is a matching pair at the corresponding feature points. On the other hand, a point indicated with "x" is an identifying feature point where a positive determination of estimating that a query image is similar to a model image is made if a correlation value between the model image and the query image is low, that is, if there is no matching pair at the corresponding feature points.

The identifying feature point comparing unit 99 in the determining unit 62 to calculate correlation values in identifying feature points by using the layer-1 model identifying feature points and the layer-2 model identifying feature points in FIG. 12 can calculate that a positive determination is not made in any of the identifying feature points in the #11 model image 161, that a positive determination is made in only the layer-1 model identifying feature points in the #12 model image 162, that a positive determination is made in both the layer-1 model identifying feature points and the layer-2 model identifying feature points in the #13 model image 163, and that a positive determination is made in only the layer-2 model identifying feature points in the #14 model image 164. That is, the identifying feature point comparing unit 99 can detect that the #11 model image 161 and the #14 model image 164 do not correspond to the query image in layer 1 and that the #12 model image 162 does not correspond to the query image in layer 2. Accordingly, it is determined that the model image corresponding to the query image 151 is the #13 model image 163.

In this way, when the similarity among model images is represented in a hierarchical structure or when there are a plurality of similar parts among the model images, identifying feature points in the similar model images can be reliably extracted by classifying similar parts or by using a hierarchical structure.

Hereinafter, identifying feature point extracting process 1, which is an example of a process performed by the identifying feature point selecting unit 61 in the recognizing apparatus 51, is described with reference to FIG. 13.

In step S11, the model image obtaining unit 71 obtains model images for an identifying process and supplies them to the model image dictionary storing unit 73 and the feature quantity extracting unit 72.

In step S12, the feature quantity extracting unit 72 extracts feature points from the respective model images supplied from the model image obtaining unit 71, extracts local feature quantities from peripheries of the feature points, and makes a vector description. The feature quantity extracting unit 72 supplies information of the extracted local feature quantities to the model image dictionary storing unit 73, the matching unit 74, and the outlier removing unit 75.

In step S13, the model image dictionary storing unit 73 stores the respective model images supplied from the model image obtaining unit 71 and the local feature quantities corresponding to the respective model images supplied from the feature quantity extracting unit 72. The model images and the local feature quantities stored in the model image dictionary storing unit 73 are supplied to the model image dictionary storing unit 91 in the determining unit 62 and are stored therein after identifying feature point extracting process 1.

In step S14, the matching unit 74 performs matching between the local feature quantities of a target model image supplied from the feature quantity extracting unit 72 and the local feature quantities of the respective model images currently stored in the model image dictionary storing unit 73 by using the K-NN method or the like, so as to obtain matching pairs. Then, the matching unit 74 supplies the target model image, similar model images having a predetermined number or more of matching pairs with respect to the target model image, and information of the matching pairs to the outlier removing unit 75.

In step S15, the outlier removing unit 75 removes mismatching pairs not satisfying geometric constraint from the matching pairs detected by the matching unit 74 by using Hough transform or RANSAC. The outlier removing unit 75 extracts a set of similar model images having the predetermined number or more of matching pairs with respect to the target model image and supplies the target model image, the similar model images, and information of the matching pairs obtained through the outlier removal to the affine parameter obtaining unit 76.

In step S16, the affine parameter obtaining unit 76 calculates affine parameters of the respective similar model images with respect to the target model image on the basis of the remaining matching pairs and supplies the calculated affine parameters to the affine transformation unit 77 in addition to the target model image, the similar model images having the predetermined number or more of matching pairs with respect to the target model image, and the information of the matching pairs obtained through the outlier removal.

In step S17, the affine transformation unit 77 transforms the supplied similar model images by using the affine parameters so as to correct the similar model images to images captured in the same size in the imaging direction corresponding to the target model image. Then, the affine transformation unit 77 supplies the target model image, the similar model images obtained through the affine transformation having the predetermined number or more of matching pairs with respect to the target model image, and the information of the matching pairs obtained through the outlier removal to the correlation image generating unit 78.

In step S18, the correlation image generating unit 78 calculates correlation values of feature quantities (feature quantity distances) between the target model image and the similar model images obtained through the affine transformation at the respective feature points of the target model image, generates correlation images between the target model image and the similar model images, and supplies the correlation images, that is, information indicating the obtained correlation values at the respective feature points, to the identifying feature point extracting unit 79.

In step S19, the identifying feature point extracting unit 79 extracts identifying feature points having a high ability of identifying a model among similar model images, that is, feature points having a correlation value lower than a threshold or a predetermined number of feature points in increasing order of correlation value, on the basis of the correlation values with respect to the similar model images at the respective feature points of the target model image. Then, the identifying feature point extracting unit 79 supplies the identifying feature points to the identifying feature point storing unit 92 in the determining unit 62 and registers them therein, and then the process ends.

In this process, identifying feature points having a high ability of identifying a model among similar model images can be obtained in each model image in addition to the feature quantities in the feature points of the model images. Accordingly, the determining unit 62 including the identifying feature point storing unit 92 in which the identifying feature points are registered can perform a process of identifying similar model images.

In step S19, the identifying feature point extracting unit 79 may extract identifying feature points in similar model images by classifying similar parts or by using a hierarchical structure, as described above with reference to FIGS. 8 to 12.

Figure 14:
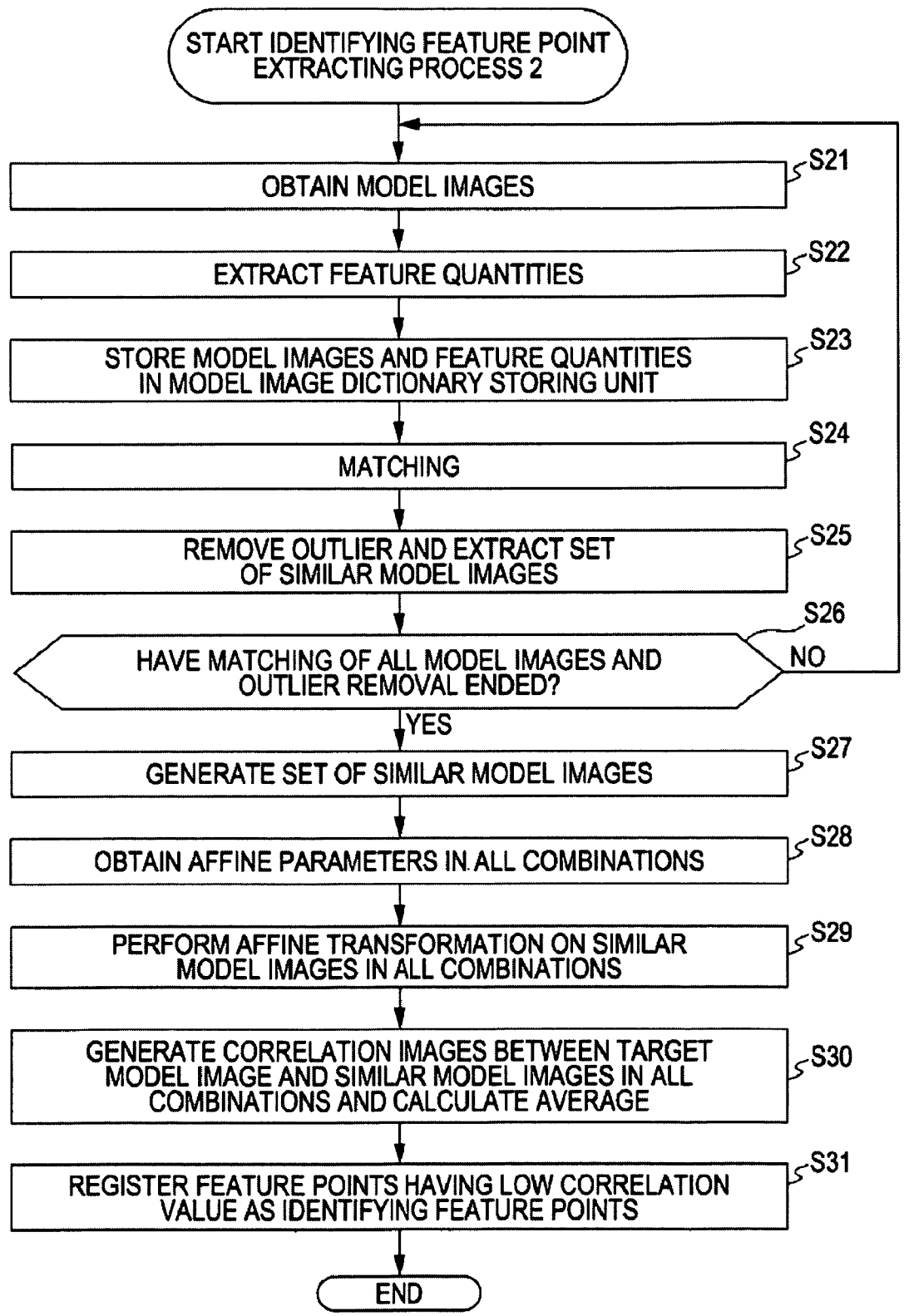
FIG. 14 is a flowchart illustrating identifying feature point extracting process 2.

Next, identifying feature point extracting process 2, which is another example of the process performed by the identifying feature point selecting unit 61 in the recognizing apparatus 51, is described with reference to FIG. 14.

In identifying feature point extracting process 1 described above with reference to FIG. 13, model images are sequentially input regardless of whether the model images are similar or not, and a process to extract identifying feature points is sequentially performed upon input of each model image. On the other hand, in identifying feature point extracting process 2, a set of similar model images is generated in advance, and identifying feature points are extracted on the basis of an average of all the correlations of combinations of the images included in the set.

Figure 13:
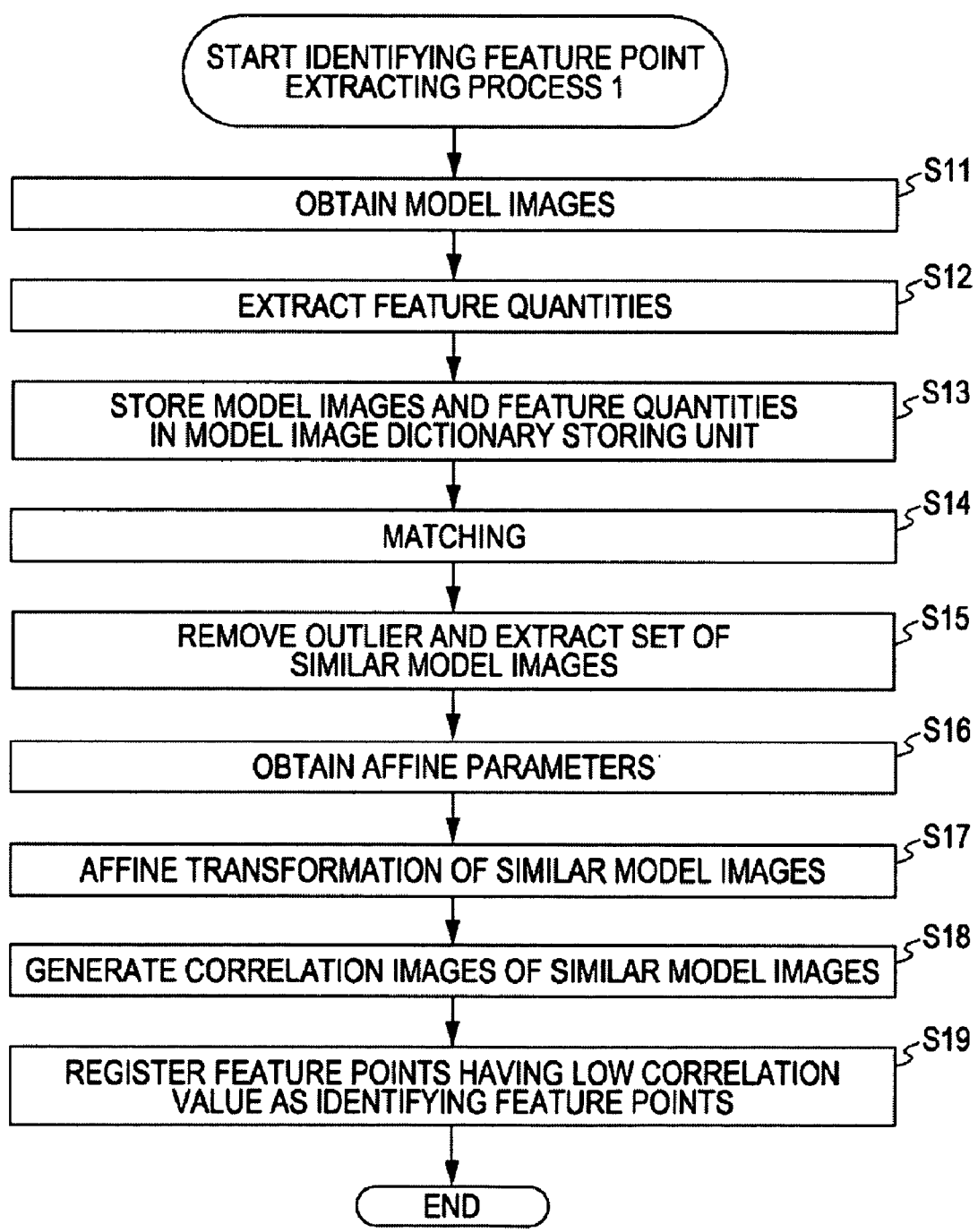
FIG. 13 is a flowchart illustrating identifying feature point extracting process 1.

In steps S21 to S25, the same process as in steps S11 to S15 illustrated in FIG. 13 is performed. That is, the model image obtaining unit 71 obtains model images for an identifying process, and the feature quantity extracting unit 72 extracts feature points from the respective model images supplied from the model image obtaining unit 71, extracts local feature quantities from peripheries of the feature points, and makes a vector description. Then, the model image dictionary storing unit 73 stores the respective model images supplied from the model image obtaining unit 71 and the local feature quantities corresponding to the respective model images supplied from the feature quantity extracting unit 72. Then, the matching unit 74 performs matching between the local feature quantities of a target model image and the local feature quantities of the respective model images currently stored in the model image dictionary storing unit 73 by using the K-NN method or the like, so as to obtain matching pairs. The outlier removing unit 75 removes mismatching pairs not satisfying geometric constraint from the matching pairs detected by the matching unit 74 by using Hough transform or RANSAC.

In step S26, the outlier removing unit 75 determines whether matching of all the model images as a target of the identifying feature point extracting process and outlier removal have ended. If it is determined in step S26 that matching of all the model images and outlier removal have not ended, the process returns to step S21 and the subsequent steps are repeated.

If it is determined in step S26 that matching of all the model images and outlier removal have ended, the process proceeds to step S27, where the outlier removing unit 75 generates a set of similar model images on the basis of the matching pairs remained after the outlier removal and supplies image data of the set of similar model images and the matching pairs obtained through the outlier removal to the affine parameter obtaining unit 76.

In step S28, the affine parameter obtaining unit 76 calculates affine parameters of the respective similar model images with respect to the target model image in all combinations of the similar model images on the basis of the matching pairs remained after the outlier removal. Then, the affine parameter obtaining unit 76 supplies the calculated affine parameters to the affine transformation unit 77 in addition to the target model image, the similar model images having the predetermined number or more of matching pairs with respect to the target model image, and information of the matching pairs obtained through the outlier removal.

In step S29, the affine transformation unit 77 transforms the supplied similar model images in all combinations of the similar model images by using the affine parameters so as to correct the similar model images to images captured in the same size in the imaging direction corresponding to the target model image. The affine transformation unit 77 supplies the target model image, the similar model images obtained through the affine transformation having the predetermined number or more of matching pairs with respect to the target model image, and the information of the matching pairs obtained through the outlier removal to the correlation image generating unit 78.

In step S30, the correlation image generating unit 78 calculates correlation values of feature quantities (feature quantity distances) between the target model image and the similar model images obtained through the affine transformation at the respective feature points of the target model image in all the combinations of the similar model images, generates correlation images between the target model image and the similar model images, and calculates the average thereof. Then, the correlation image generating unit 78 supplies the average value of the correlation images, that is, information indicating the average value of the correlation values at the respective feature points, to the identifying feature point extracting unit 79.

In step S31, the identifying feature point extracting unit 79 extracts identifying feature points having a high ability of identifying a model among similar model images, that is, feature points having a correlation value lower than a threshold or a predetermined number of feature points in increasing order of correlation value, on the basis of the average of the correlation values with respect to the similar model images at the respective feature points of the target model image. Then, the identifying feature point extracting unit 79 supplies the identifying feature points to the identifying feature point storing unit 92 in the determining unit 62 and registers them therein, and then the process ends.

In this process, identifying feature points having a high ability of identifying a model among similar model images can be obtained in each model image in addition to the feature quantities in the feature points of the model images. Accordingly, the determining unit 62 including the identifying feature point storing unit 92 in which the identifying feature points are registered can perform a process of identifying similar model images.

In step S31, the identifying feature point extracting unit 79 may extract identifying feature points in similar model images by classifying similar parts or by using a hierarchical structure, as described above with reference to FIGS. 8 to 12.

Figure 15:
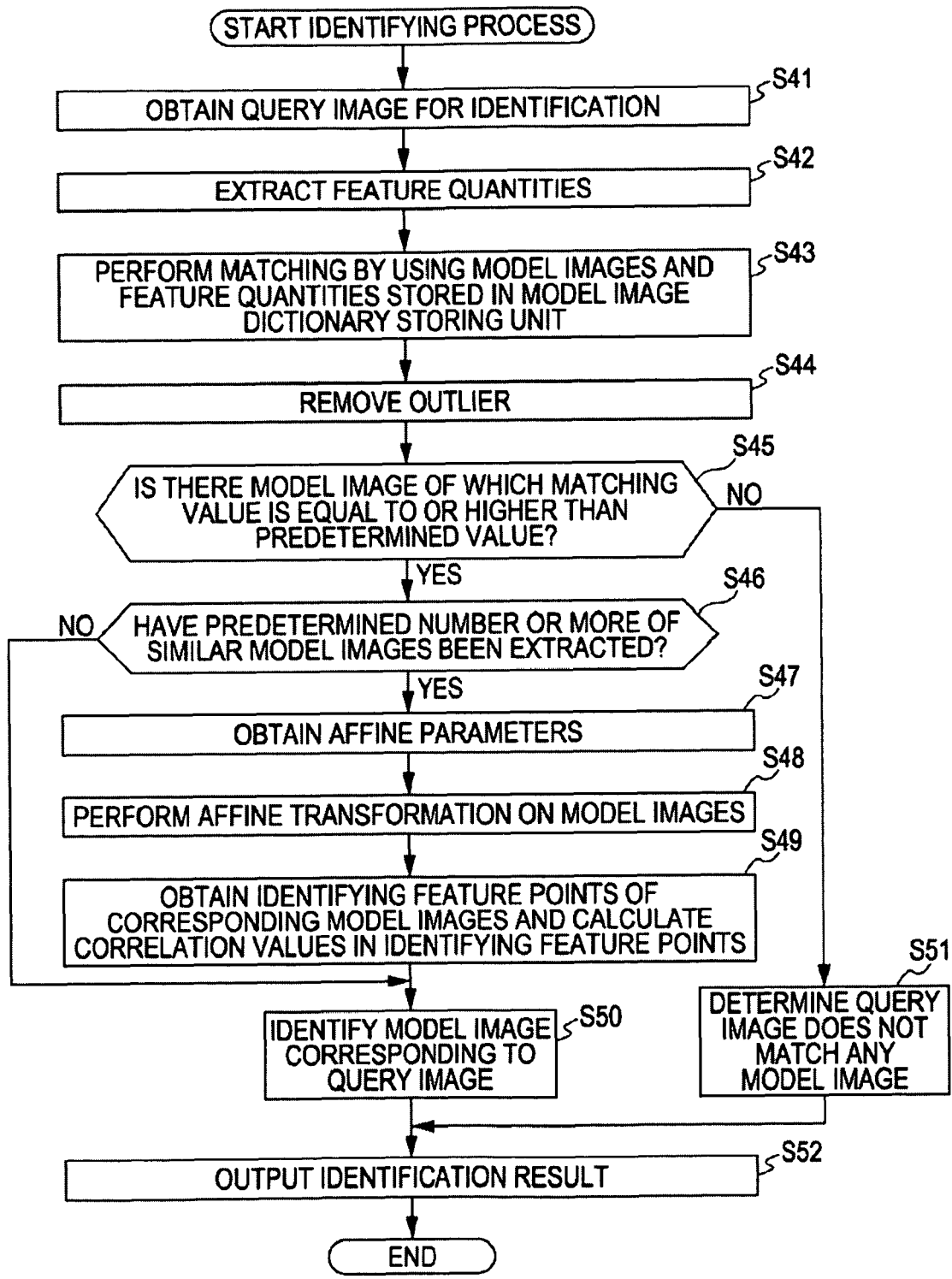
FIG. 15 is a flowchart illustrating an identifying process.

Next, an identifying process performed by the determining unit 62 in the recognizing apparatus 51 is described with reference to the flowchart illustrated in FIG. 15.

In step S41, the query image obtaining unit 93 obtains a query image for identification.

In step S42, the feature quantity extracting unit 94 extracts feature points from the query image supplied from the query image obtaining unit 93, extracts local feature quantities from peripheries of the feature points, and makes a vector description. The feature quantity extracting unit 94 supplies information of the extracted local feature quantities and the query image to the matching unit 95 and the outlier removing unit 96.

In step S43, the matching unit 95 performs matching between the local feature quantities supplied from the feature quantity extracting unit 94 and the local feature quantities corresponding to the model images stored in the model image dictionary storing unit 91 by using the K-NN method or the like, so as to obtain matching pairs. Then, the matching unit 95 supplies the query image, data of similar model images which are model images having a predetermined number or more of matching pairs with respect to the query image, and information of the matching pairs to the outlier removing unit 96.

In step S44, the outlier removing unit 96 removes mismatching pairs not satisfying geometric constraint from the matching pairs detected by the matching unit 95 by using Hough transform or RANSAC.

In step S45, the outlier removing unit 96 determines whether there exists a model image of which matching value is equal to or higher than a predetermined value. If it is determined in step S45 that there exists no model image of which matching value is equal to or higher than the predetermined value, the outlier removing unit 96 supplies the determination result to the identifying unit 100, and the process proceeds to step S51.

If it is determined in step S45 that there exists a model image of which matching value is equal to or higher than the predetermined value, the process proceeds to step S46, where the outlier removing unit 96 determines whether a predetermined number or more of model images having matching pairs remained after the outlier removal of which number is larger than a threshold have been extracted, in other words, whether a similar model image exists. If it is determined in step S46 that the predetermined number or more of model images have not been extracted, the outlier removing unit 96 supplies the model images of which matching value is equal to or higher than the predetermined value and the matching pairs remained after the removal to the identifying unit 100, and the process proceeds to step S50.

If it is determined in step S46 that the predetermined number or more of model images have been extracted, the process proceeds to step S47, where the outlier removing unit 96 supplies the predetermined number or more of model images having remaining matching pairs of which number is larger than the threshold, that is, similar model images, the query image, and information of matching pairs obtained through the outlier removal to the affine parameter obtaining unit 97. The affine parameter obtaining unit 97 obtains affine parameters of the respective similar model images with respect to the query image on the basis of the remaining matching pairs and supplies the query image, the affine parameters, the similar model images, and the information of the matching pairs obtained through the outlier removal to the affine transformation unit 98.

In step S48, the affine transformation unit 98 transforms the supplied similar model images by using the affine parameters so as to correct the similar model images to images captured in the same size in the imaging direction corresponding to the query image. The affine transformation unit 98 supplies the query image, the similar model images obtained through the affine transformation, and the information of the matching pairs obtained through the outlier removal to the identifying feature point comparing unit 99.

In step S49, the identifying feature point comparing unit 99 obtains identifying feature points in the similar model images obtained through the affine transformation on the basis of the identifying feature points of the respective model images stored in the identifying feature point storing unit 92, calculates the feature quantities at the identifying feature points, and calculates correlation values in the identifying feature points with respect to the feature quantities on the query image.

In step S19, if the identifying feature point extracting unit 79 extracts identifying feature points in similar model images by classifying similar parts or by using a hierarchical structure as described above with reference to FIGS. 8 to 12, the identifying feature point comparing unit 99 calculates correlation values in accordance with the respective identifying feature points that are classified or hierarchized.

If it is determined in step S46 that the predetermined number or more of matching pairs have not been extracted or after step S49, the process proceeds to step S50, where the identifying unit 100 identifies the model image corresponding to the query image on the basis of the number of matching pairs between the respective model images and the query image supplied from the outlier removing unit 96 or the correlation values in the identifying feature points between the similar model images and the query image supplied from the identifying feature point comparing unit 99, and outputs the identification result to the identification result output unit 101.

If it is determined in step S45 that there is no model image having a matching value equal to or higher than the predetermined value, the process proceeds to step S51, where the identifying unit 100 determines that the query image does not match any of the model images on the basis of a notification from the outlier removing unit 96 and outputs the determination result to the identification result output unit 101.

After step S50 or S51, the process proceeds to step S52, where the identification result output unit 101 displays the identification result supplied from the identifying unit 100 in a display unit, outputs the identification result as voice data, or outputs the identification result to another apparatus by outputting the result through a predetermined transmission path or recording the result on a predetermined recording medium. Then, the process ends.

In the above-described processes, the images 11 to 15 illustrated in FIG. 1 are registered as model images. When the query image 111 described above with reference to FIG. 4 is input, the image 12 can be selected from among the images 11 to 15 that match the query image in many feature points.

In the above-described processes, the recognizing apparatus 51 can correctly recognize the most similar model among a plurality of similar models while maintaining occlusion-resistant and robust characteristics of a general object recognizer.

The recognizing apparatus 51 has been described as a single apparatus, but the identifying feature point selecting unit 61 and the determining unit 62 may be configured as separate apparatuses.

Extraction of identifying feature points and identification of images are not necessarily performed continuously. The identifying feature point selecting unit 61 and the determining unit 62 may be configured as different apparatuses and may be separately placed. In other words, even if the apparatus corresponding to the determining unit 62 including the identifying feature point storing unit 92 that stores identifying feature points generated by the apparatus corresponding to the identifying feature point selecting unit 61 is placed separately from the apparatus corresponding to the identifying feature point selecting unit 61, the apparatus corresponding to the determining unit 62 can independently perform a process of identifying images.

The series of above-described processes can be performed by hardware or software. The program constituting the software is installed from a recording medium to a computer incorporated into dedicated hardware or a multi-purpose personal computer capable of performing various functions by being installed with various programs. In this case, the above-described processes are performed by a personal computer 500 illustrated in FIG. 16.

Figure 16:
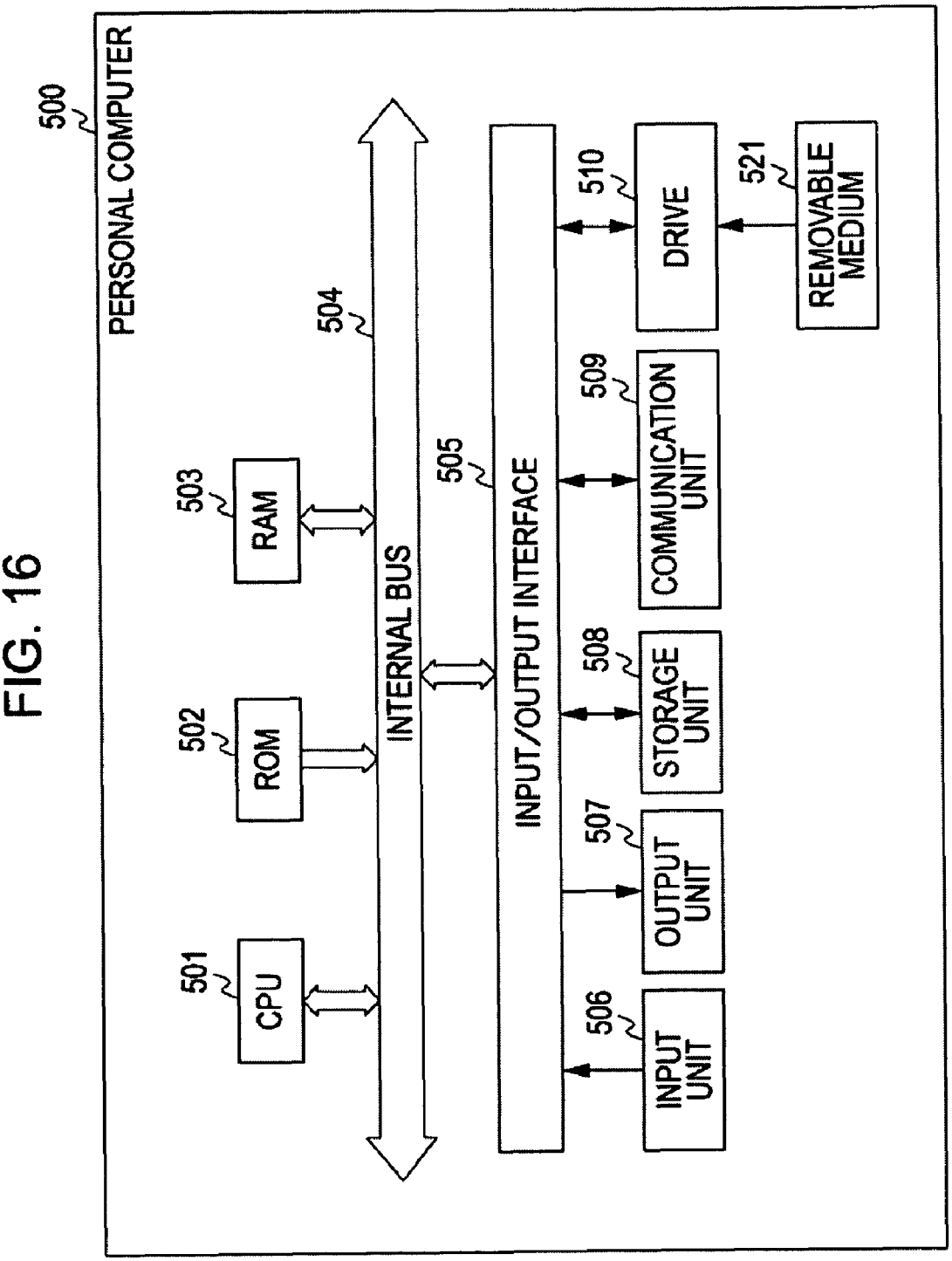
FIG. 16 is a block diagram illustrating a configuration of a personal computer.

Referring to FIG. 16, a CPU (central processing unit) 501 performs various processes in accordance with a program stored in a ROM (read only memory) 502 or a program loaded from a storage unit 508 to a RAM (random access memory) 503. The RAM 503 also stores data necessary for the CPU 501 to perform various processes.

The CPU 501, the ROM 502, and the RAM 503 are mutually connected via an internal bus 504. The internal bus 504 connects to an input/output interface 505.

The input/output interface 505 connects to an input unit 506 including a keyboard and a mouse, an output unit 507 including a display, such as a CRT (cathode ray tube) or an LCD (liquid crystal display), and a speaker, the storage unit 508 including a hard disk or the like, and a communication unit 509 including a modem and a terminal adaptor. The communication unit 509 performs communication via various networks including a telephone line and a CATV (cable television).

The input/output interface 505 also connects to a drive 510 as necessary, and a removable medium 521 such as a magnetic disk, an optical disc, a magneto-optical disc, or a semiconductor memory is loaded thereto. A computer program read from the removable medium 521 is installed into the storage unit 508 as necessary.

When the series of processes are performed by software, the program constituting the software is installed through a network or a recording medium.

The recording medium may be a package medium separated from a computer, such as the removable medium 521 illustrated in FIG. 16 that carries the program and that is distributed to provide the program to a user. Alternatively, the recording medium may be a hard disk, including the ROM 502 and the storage unit 508, that carries the program and that is provided to a user while being incorporated in the main body of the apparatus.

In this specification, the steps describing the program recorded on a recording medium may be performed in time series in accordance with the described order. Alternatively, the steps may be performed in parallel or individually.

In this specification, a system means an entire apparatus including a plurality of devices.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus to generate information used to identify images, the information processing apparatus comprising:
    model image obtaining means for obtaining a plurality of model images;
    model image feature quantity extracting means for extracting feature quantities of the model images obtained by the model image obtaining means;
    matching means for performing matching on the feature quantities of the model images extracted by the model image feature quantity extracting means; and
    identifying feature point extracting means for extracting, as a result of the matching performed by the matching means, feature points having a low correlation with a predetermined model image in similar model images that are the model images having a predetermined number or more of the feature quantities that match feature quantities of the predetermined model image, the extracted feature points being regarded as identifying feature points used for identification of the respective similar model images, wherein the identifying feature points extracted by the identifying feature point extracting means are classified into a first group and a second group, each of the model images being identified as a corresponding similar model image when having a larger number of matching pairs at the identifying feature points in the first group or when having a smaller number of matching pairs at the identifying feature points in the second group.

2. The information processing apparatus according to claim 1,
    wherein the matching means includes outlier removing means for removing an outlier from a result of the matching performed on the feature quantities of the model images.

3. The information processing apparatus according to claim 1, further comprising:
    first transforming means for performing affine transformation on the similar model images so that the similar model images conform to the predetermined model image,
    wherein the identifying feature point extracting means extracts the identifying feature points by using the similar model images obtained through the transformation performed by the first transforming means.

4. The information processing apparatus according to claim 1, further comprising:
    recognized image obtaining means for obtaining a recognized image;
    recognized image feature quantity extracting means for extracting feature quantities of the recognized image obtained by the recognized image obtaining means; and
    identifying means for identifying the similar model image corresponding to the recognized image by obtaining correlations in feature quantity between the similar model images and the recognized image in the identifying feature points extracted by the identifying feature point extracting means.

5. The information processing apparatus according to claim 4, further comprising:
    second transforming means for performing affine transformation on the similar model images so that the similar model images conform to the recognized image,
    wherein the identifying means identifies the similar model image corresponding to the recognized image by using the similar model images obtained through the transformation performed by the second transforming means.

6. The information processing apparatus according to claim 1,
    wherein the identifying feature point extracting means hierarchically extracts the identifying feature points.

7. A computer-implemented information processing method for an information processing apparatus to generate information used to identify images, the information processing method comprising the steps of:
    obtaining a plurality of model images;
    extracting, using at least one processing unit, feature quantities of the obtained model images;
    performing matching on the extracted feature quantities of the model images;
    extracting, as a result of the matching, feature points having a low correlation with a predetermined model image in similar model images that are the model images having a predetermined number or more of the feature quantities that match feature quantities of the predetermined model image, the extracted feature points being regarded as identifying feature points used for identification of the respective similar model images; and
    classifying the identifying feature points into a first group and a second group, each of the model images being identified as a corresponding similar model image when having a larger number of matching pairs at the identifying feature points in the first group or when having a smaller number of matching pairs at the identifying feature points in the second group.

8. A non-transitory recoding medium having recorded therein a program that allows a computer to perform a process of generating information used to identify images, the program allowing the computer to perform a process comprising the steps of:
    obtaining a plurality of model images;
    extracting feature quantities of the obtained model images;
    performing matching on the extracted feature quantities of the model images;
    extracting, as a result of the matching, feature points having a low correlation with a predetermined model image in similar model images that are the model images having a predetermined number or more of the feature quantities that match feature quantities of the predetermined model image, the extracted feature points being regarded as identifying feature points used for identification of the respective similar model images; and
    classifying the identifying feature points into a first group and a second group, each of the model images being identified as a corresponding similar model image when having a larger number of matching pairs at the identifying feature points in the first group or when having a smaller number of matching pairs at the identifying feature points in the second group.

9. An image identifying apparatus to store a plurality of model images and feature quantities of the model images, accept input of a recognized image, and identify the model image corresponding to the recognized image, the image identifying apparatus comprising:
- storage means for storing identifying feature points that are feature points having a low correlation among similar model images in the similar model images that are a plurality of the model images having a predetermined number or more of the feature quantities matching any of the other model images;
- recognized image obtaining means for obtaining the recognized image;
- recognized image feature quantity extracting means for extracting feature quantities of the recognized image obtained by the recognized image obtaining means;
- identifying means for identifying the similar model image corresponding to the recognized image by obtaining correlations in feature quantity between the similar model images and the recognized image in the identifying feature points stored by the storage means; and
- matching means for performing matching of the feature quantities between the recognized image obtained by the recognized image obtaining means and the stored model images, wherein,
  - as a result of the matching performed by the matching means, if there are a predetermined number or more of the model images having feature quantities of a predetermined threshold or more matching the recognized image, the identifying means regards the predetermined number or more of the model images as the similar model images and identifies the similar model image corresponding to the recognized image by obtaining correlations in feature quantity between the similar model images and the recognized image in the identifying feature points stored by the storage means.

10. The image identifying apparatus according to claim 9, further comprising:
- transforming means for performing affine transformation on the similar model images so that the similar model images conform to the recognized image,
- wherein the identifying means identifies the similar model image corresponding to the recognized image by using the similar model images obtained through the transformation performed by the transforming means.

11. The image identifying apparatus according to claim 9, wherein the matching means includes outlier removing means for removing an outlier from a result of matching of the feature quantities among the model images.

12. The image identifying apparatus according to claim 9, wherein the identifying feature points stored by the storage means are classified into a first group and a second group, each of the model images being identified as a corresponding similar model image when having a larger number of matching pairs at the identifying feature points in the first group or when having a smaller number of matching pairs at the identifying feature points in the second group.

13. The image identifying apparatus according to claim 9, wherein the identifying feature points stored by the storage means have a hierarchical structure.

14. A computer-implemented image identifying method for an image identifying apparatus that includes a first storage unit to store a plurality of model images and feature quantities of the model images and a second storage unit to store identifying feature points that are feature points having a low correlation among similar model images in the similar model images that are a plurality of the model images having a predetermined number or more of the feature quantities matching any of the other model images, that accepts input of a recognized image, and that identifies the model image corresponding to the recognized image, the image identifying method comprising the steps of:
- obtaining the recognized image;
- extracting, using at least one processing unit, feature quantities of the obtained recognized image;
- performing matching of the feature quantities between the recognized image and the stored model images, wherein, as a result of the matching, if there are a predetermined number or more of the model images having feature quantities of a predetermined threshold or more matching the recognized image, the predetermined number or more of the model images are regarded as the similar model images; and
- identifying the similar model image corresponding to the recognized image by obtaining correlations in feature quantity between the similar model images and the recognized image in the identifying feature points.

15. A non-transitory recoding medium having recorded therein a program that allows a computer to perform a process of identifying a model image corresponding to an input recognized image by using information stored in a first storage unit to store a plurality of model images and feature quantities of the model images and a second storage unit to store identifying feature points that are feature points having a low correlation among similar model images in the similar model images that are a plurality of the model images having a predetermined number or more of the feature quantities matching any of the other model images, the program allowing the computer to perform a process comprising the steps of:
- obtaining the recognized image;
- extracting feature quantities of the obtained recognized image;
- performing matching of the feature quantities between the recognized image and the stored model images, wherein, as a result of the matching, if there are a predetermined number or more of the model images having feature quantities of a predetermined threshold or more matching the recognized image, the predetermined number or more of the model images are regarded as the similar model images; and
- identifying the similar model image corresponding to the recognized image by obtaining correlations in feature quantity between the similar model images and the recognized image in the identifying feature points.

16. An information processing apparatus to generate information used to identify images, the information processing apparatus comprising:
- a model image obtaining unit configured to obtain a plurality of model images;
- a model image feature quantity extracting unit configured to extract feature quantities of the model images obtained by the model image obtaining unit;
- a matching unit configured to perform matching on the feature quantities of the model images extracted by the model image feature quantity extracting unit; and
- an identifying feature point extracting unit configured to extract, as a result of the matching performed by the matching unit, feature points having a low correlation with a predetermined model image in similar model images that are the model images having a predetermined number or more of the feature quantities that match feature quantities of the predetermined model image, the extracted feature points being regarded as identifying feature points used for identification of the respective similar model images, wherein the identifying feature points extracted by the identifying feature point extracting unit are classified into a first group and a second group, each of the model images being identified as a corresponding similar model image when having a larger number of matching pairs at the identifying feature points in the first group or when having a smaller number of matching pairs at the identifying feature points in the second group.

17. An image identifying apparatus to store a plurality of model images and feature quantities of the model images, accept input of a recognized image, and identify the model image corresponding to the recognized image, the image identifying apparatus comprising:

a storage unit configured to store identifying feature points that are feature points having a low correlation among similar model images in the similar model images that are a plurality of the model images having a predetermined number or more of the feature quantities matching any of the other model images;

a recognized image obtaining unit configured to obtain the recognized image;

a recognized image feature quantity extracting unit configured to extract feature quantities of the recognized image obtained by the recognized image obtaining unit;

an identifying unit configured to identify the similar model image corresponding to the recognized image by obtaining correlations in feature quantity between the similar model images and the recognized image in the identifying feature points stored by the storage unit; and a matching unit configured to perform matching of the feature quantities between the recognized image obtained by the recognized image obtaining unit and the stored model images, wherein, as a result of the matching performed by the matching unit, if there are a predetermined number or more of the model images having feature quantities of a predetermined threshold or more matching the recognized image, the identifying unit regards the predetermined number or more of the model images as the similar model images and identifies the similar model image corresponding to the recognized image by obtaining correlations in feature quantity between the similar model images and the recognized image in the identifying feature points stored by the storage unit.

* * * * *